(12) United States Patent
Murphy et al.

(10) Patent No.: US 9,327,174 B2
(45) Date of Patent: *May 3, 2016

(54) SPORTS BAG WITH INTEGRAL TRANSPORTATION SYSTEM

(71) Applicant: GOLF-N-GO, L.L.C., Metairie, LA (US)

(72) Inventors: Howard L. Murphy, Gretna, LA (US); Thomas F. Gardner, Metairie, LA (US); Daryl Marse, New Orleans, LA (US)

(73) Assignee: GOLF-N-G-, L.L.C., Metairie, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,020

(22) Filed: Jul. 1, 2014

(65) Prior Publication Data

US 2015/0084296 A1 Mar. 26, 2015

Related U.S. Application Data

(63) Continuation of application No. 13/099,617, filed on May 3, 2011, now Pat. No. 8,764,030, which is a continuation-in-part of application No. 11/303,442, filed on Dec. 15, 2005, now Pat. No. 7,934,729, which (Continued)

(51) Int. Cl.
*B62B 3/12* (2006.01)
*A63B 55/04* (2006.01)
(Continued)

(52) U.S. Cl.
CPC .................. *A63B 55/04* (2013.01); *A63B 55/00* (2013.01); *A63B 55/50* (2015.10); *A63B 55/60* (2015.10);

(Continued)

(58) Field of Classification Search
CPC ........ A63B 55/00; A63B 55/30; A63B 55/60; B62B 1/045; B62B 3/12; B62B 1/262; B62B 2202/404; B62B 2202/406; B62B 2205/14; B62B 2205/145

See application file for complete search history.

(56) References Cited

U.S. PATENT DOCUMENTS 2,579,937 A * 12/1951 Larsen ............................. 280/42
2,590,178 A * 3/1952 Jamison .......................... 280/37

(Continued)

*Primary Examiner* — Katy M Ebner
(74) *Attorney, Agent, or Firm* — Brett A. North; Garvey, Smith, Nehrbass & North, L.L.C.

(57) ABSTRACT

Disclosed is a sports bag assembly with an integral wheeled transportation system. The bag assembly can accommodate the transportation and storage of sports equipment. The wheels can be deployed and retracted with a single mechanical movement, and may be stowed within the geometry of the bag. The bag assembly can fit within the recessed areas of platforms on the rear of motorized golf carts; within conventional storage stands, racks, lockers, vehicle trunks and/or hatches typically found around golf courses and in residences; and within travel containers or other systems for traditional golf bags. The golf bag assembly may also include a ventilated club storage compartment to facilitate the drying of clubs (including grips), and allow drainage of fluids which may enter the interior of the bag assembly. The bag assembly can also include a support and suspension system which restrains the grip and upper shaft or hosel ends of clubs which stabilizes and protects clubs during transport and play. The restraint system also can enhance the golfing experience by reducing or eliminating noise generated by clubs banging together during transportation. The restraint system can also extend the life of golf clubs by preventing contact between clubs, which contact could damage and alter frequency settings for various clubs.

19 Claims, 24 Drawing Sheets

Related U.S. Application Data is a continuation-in-part of application No. 11/143,936, filed on Jun. 3, 2005, now Pat. No. 7,287,765, and a continuation-in-part of application No. PCT/US2005/019252, filed on Jun. 3, 2005.

(60) Provisional application No. 60/576,620, filed on Jun. 4, 2004, provisional application No. 60/618,588, filed on Oct. 15, 2004.

(51) Int. Cl.
    *A63B 55/00* (2015.01)
    *B62B 1/04* (2006.01)

(52) U.S. Cl.
    CPC ............... *B62B 1/042* (2013.01); *B62B 1/045* (2013.01); *B62B 3/12* (2013.01); *A63B 2210/50* (2013.01); *B62B 2202/406* (2013.01); *Y10S 280/06* (2013.01)

(56) References Cited

U.S. PATENT DOCUMENTS

| | | | | |
|---|---|---|---|---|
| 2,699,951 A * | 1/1955 | Gans | ................................ | 280/38 |
| 2,726,874 A * | 12/1955 | Sullivan | ........................... | 280/37 |
| 2,760,782 A * | 8/1956 | Hartzell | ........................ | 280/655 |
| 2,902,287 A * | 9/1959 | Elias | ................................ | 280/38 |
| 3,489,426 A * | 1/1970 | Bond | ............................... | 280/40 |
| 3,738,677 A * | 6/1973 | Renock | ........................... | 280/37 |
| 3,900,209 A * | 8/1975 | McDonnell | ................... | 280/655 |
| 3,985,373 A * | 10/1976 | Widegren | .................... | 280/652 |
| 4,017,091 A * | 4/1977 | Wallen | ........................... | 280/30 |
| 4,053,169 A * | 10/1977 | Taylor | ............................ | 280/37 |
| 4,400,006 A * | 8/1983 | Larkin | .......................... | 280/646 |
| 4,522,299 A * | 6/1985 | Clark et al. | ................. | 206/315.3 |
| 4,735,425 A * | 4/1988 | Hoff | .......................... | 280/47.18 |
| 4,792,152 A * | 12/1988 | Carolan | ..................... | 280/47.26 |
| 4,822,071 A * | 4/1989 | Widegren | ..................... | 280/646 |
| 4,832,362 A * | 5/1989 | Chen | .............................. | 280/645 |
| 4,890,856 A * | 1/1990 | Mursch et al. | ................ | 280/646 |
| 5,112,068 A * | 5/1992 | Liao et al. | ....................... | 280/30 |
| 5,267,750 A * | 12/1993 | Thompson | ..................... | 280/646 |
| 5,427,403 A * | 6/1995 | Hsiao | ............................ | 280/646 |
| 5,435,546 A * | 7/1995 | Rao | ................................. | 224/274 |
| 5,454,576 A * | 10/1995 | Pitkanen | ......................... | 280/42 |
| 5,470,095 A * | 11/1995 | Bridges | ......................... | 280/646 |
| 5,478,097 A * | 12/1995 | Forma | ........................ | 280/47.26 |
| 5,632,496 A * | 5/1997 | Nelson | ............................ | 280/30 |
| 5,868,247 A * | 2/1999 | Schrader | .................... | 206/315.4 |
| 5,879,022 A * | 3/1999 | Winton | ......................... | 280/655 |
| 5,944,132 A * | 8/1999 | Davies et al. | ................... | 180/168 |
| 6,007,031 A * | 12/1999 | Tang | ............................... | 248/96 |
| 6,050,592 A * | 4/2000 | Kim | ............................... | 280/652 |
| 6,056,301 A * | 5/2000 | Berliner et al. | .............. | 280/43.1 |
| 6,186,522 B1 * | 2/2001 | Weis | ................................ | 280/37 |
| 6,231,059 B1 * | 5/2001 | Cheldin | ...................... | 280/47.24 |
| 6,299,183 B1 * | 10/2001 | Kaneko | ........................ | 280/47.26 |
| D459,850 S * | 7/2002 | Seng | ............................... | D34/15 |
| 6,425,589 B1 * | 7/2002 | Wu | ................................. | 280/30 |
| 6,520,327 B1 * | 2/2003 | Boardman et al. | ........... | 206/315.4 |
| 6,554,299 B1 * | 4/2003 | Bartos | ......................... | 280/47.26 |
| 6,561,527 B2 * | 5/2003 | Spadino | ..................... | 280/47.26 |
| 6,607,076 B1 * | 8/2003 | Smith | .......................... | 206/315.6 |
| 6,659,477 B2 * | 12/2003 | Jung | ............................ | 280/47.26 |
| 6,698,789 B2 * | 3/2004 | Reimers et al. | ................. | 280/651 |
| D488,606 S * | 4/2004 | Scholz | ............................ | D34/15 |
| 6,979,019 B2 * | 12/2005 | Chen | ............................. | 280/652 |
| 7,080,732 B2 * | 7/2006 | Bonfanti | .................... | 206/315.3 |
| 7,114,730 B2 * | 10/2006 | Cheldin | ...................... | 280/47.24 |
| 2003/0146602 A1 * | 8/2003 | Lu | .................................. | 280/655 |
| 2004/0046343 A1 * | 3/2004 | Sorenson et al. | ........... | 280/47.23 |
| 2004/0113380 A1 * | 6/2004 | Freedman | .................. | 280/47.26 |

\* cited by examiner

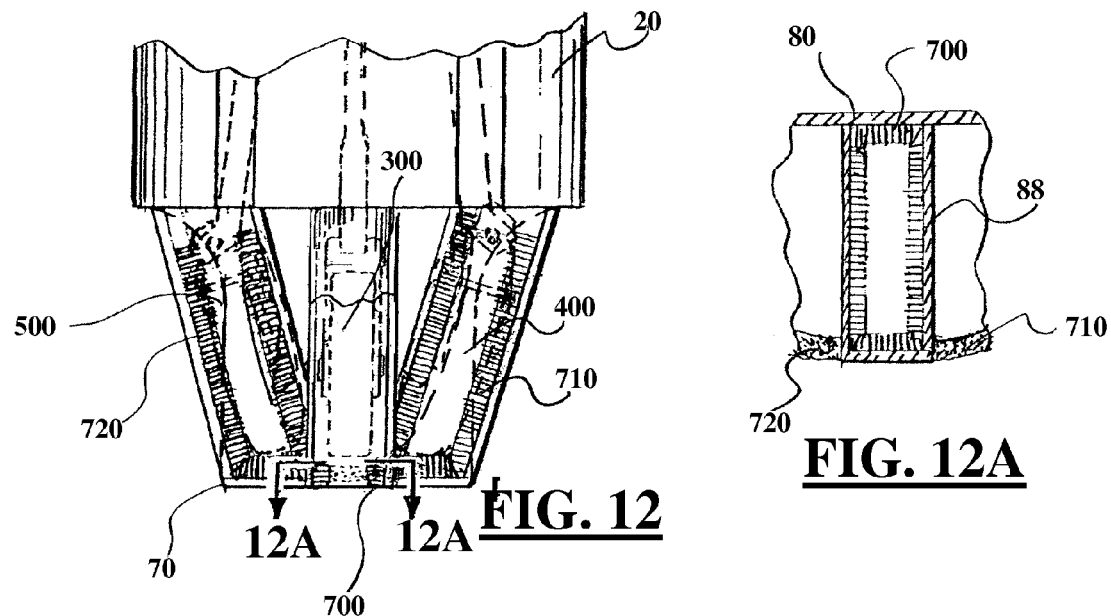
FIG. 12
FIG. 12A
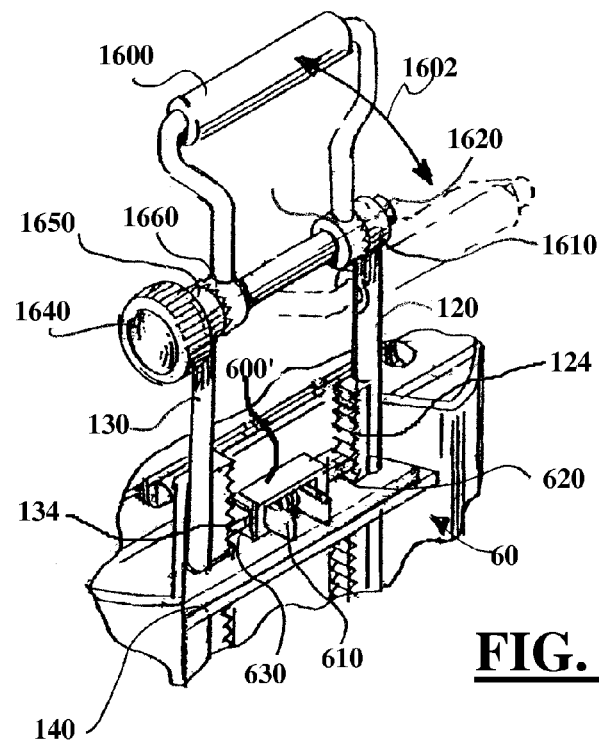
FIG. 13

SPORTS BAG WITH INTEGRAL TRANSPORTATION SYSTEM

CROSS-REFERENCE TO RELATED APPLICATIONS

This is a continuation of U.S. patent application Ser. No. 13/099,617, filed May 3, 2011 (issued as U.S. Pat. No. 8,764, 030 on Jun. 1, 2014) which is a continuation-in-part of U.S. patent application Ser. No. 11/303,442, filed Dec. 15, 2005, (issued as U.S. Pat. No. 7,934,729 on May 3, 2011) which was a continuation-in-part of U.S. patent application Ser. No. 11/143,936, filed Jun. 3, 2005 (now U.S. Pat. No. 7,287,765), which application was a non-provisional of U.S. Provisional Patent application Ser. No. 60/576,620, filed Jun. 4, 2004, and U.S. Provisional Patent application Ser. No. 60/618,588, filed Oct. 15, 2004. Priority of each of these applications is hereby claimed and each is incorporated herein by reference.

This is also a continuation-in-part of U.S. patent application Ser. No. 11/303,442, filed Dec. 15, 2005, (issuing as U.S. Pat. No. 7,934,729 on May 3, 2011) which was a continuation-in-part of PCT Patent application number PCT/US2005/019252, filed Jun. 3, 2005, which was a non-provisional of U.S. Provisional Patent application Ser. No. 60/576,620, filed Jun. 4, 2004, and U.S. Provisional Patent application Ser. No. 60/618,588, filed Oct. 15, 2004. Priority of each of these applications is hereby claimed and each is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Golf is a game played on a natural surface, although some surfaces can be artificial. In golf, an individual uses a golf club to strike a ball (which ball can be mounted on a tee); ultimately desiring to sink the ball into a hole located some distance away from the tee. After striking the ball from a tee, the golfer must transport clubs, golf accessories, and personal items to the ball's new location and repeat the striking and transporting process over the length of the hole until the golfer ultimately reaches the green area and completes the hole by sinking the ball in the hole. Typically, the golfer's clubs and various golf accessories and personal items can be located in a bag. After the completion of a hole, the golfer then transports clubs, golf accessories, and personal items to the next tee area. This sequence is repeated throughout a round of golf, which traditionally is played outdoors on a course that consists of eighteen holes and spans a distance of between three to eight miles.

A golf bag for the transportation of clubs, golf accessories, and personal items can be standard equipment for any golfer. Traditional golf bags generally are cylindrical in shape with an opening at the top of the bag to accommodate insertion and removal of clubs and some types of accessories which may be elongated. Additionally, traditional golf bags typically are equipped with compartments or pockets placed at various locations on the outer circumference to facilitate transportation and storage of golf accessories and personal items.

The storage of clubs, golf accessories, and personal items adds substantial weight to golf bags and often creates heavy loads for golfers to lift, move, carry, or otherwise transport about the golf course. To ease this burden, some golf bags have incorporated shoulder straps or hand grips located on the bag's outer circumference. Some golfers hire caddies or assistants to carry the golf bag throughout a round of golf. Some golfers mount their bags on a pull or push carts which can be rolled or on motorized golf carts.

Golfers expend considerable physical effort, in addition to expense, in avoiding the burdens of manually lifting, carrying, moving, and/or transporting their golf bags around a golf course. Although wheels can be mounted to the base of golf bags in a permanently fixed and exposed location, such wheels are awkward in appearance. Additionally, such wheels can be hazardous, especially when golfers insert or remove these wheeled bags from trunks or storage hatches of vehicles. Additionally, golf bags with wheels in permanently fixed and exposed positions generally do not fit within the recessed areas of typical platforms of motorized golf carts. Wheels which are permanently fixed and exposed also create bulky and irregular shapes making it difficult to store such golf bags in conventional storage stands, racks, bins, lockers, trunks, platforms or other similar storage configurations found in and around golf courses. Additionally, golf bags with permanently fixed and exposed wheels do not fit within travel containers or systems for traditional golf bags.

Some golf bag designs have sought to address the awkward appearance, difficulties in handling and storage, and operational hazards posed by permanently fixed and exposed wheels by making the wheels detachable. However, after detachment, the wheels and their associated equipment must be stored either within the bag itself or in a separate carryall or container. Stowing the detached wheels and associated equipment within the bag, severely compromises the amount of space within the bag's storage area for clubs. Such reduction in space precludes or limits room needed for the adequate storage of clubs, golf accessories, and personal items. It also impairs a golfer's ability to remove and re-insert clubs. Furthermore, a golfer must expend considerable time and effort attaching the wheels and their associated equipment to the bag before starting play, and detaching and storing these items after play is completed.

Additionally, designs with detachable wheels and their associated equipment typically require: that the length and circumference of the bag be substantially increased (compared to traditional golf bags); that the modified bag be reshaped in an entirely new configuration, such as a square or rectangle; or that the outer compartments of the bag be materially expanded to accommodate the storage of the detached wheels and their associated equipment as well as golf accessories and personal items. Such modifications create an excessively bulky and deformed rolling bag bearing little resemblance to traditional golf bags—making the bag substantially greater in weight; difficult to maneuver; and generally unsuitable for the transportation and storage of clubs, golf accessories, and personal items. Enlarging the bag's length and circumference (in addition to the bag's outer compartments) also causes the breadth of the bag to be so broad, that it cannot fit within the recessed areas of platforms on the rear of motorized golf carts. Furthermore, the modified bag is dimensionally incompatible with conventional storage stands, racks, bins, lockers, trunks, platforms, and other similar storage configurations typically found in and around golf courses and residences, and also within travel containers and systems for traditional golf bags.

Prior attempts to overcome the challenges faced when incorporating a transportation system into a traditionally shaped golf bag have not been satisfactory.

Presently there is no golf bag with a three or more wheel integral transportation system, and there is no three or more wheel integral transportation system which can be deployed and retracted without requiring the assembly and disassembly of component parts. Additionally, there is no golf bag having an integral transportation system that maintains the appearance and dimensions of a traditional golfbag; that includes adequate storage space for clubs, golf accessories, and personal items; that uses a portion of the space commonly used for shorter golf club storage to stow a portion of the integral transportation system; that does not limit the regulatory permissible number of clubs that may be stored in the club storage area; that reduces the operational hazards associated with transferring the golf bag assembly in and out of vehicle trunks or hatches; that fits in the recessed areas of platforms on the rear of motorized carts; and/or that is dimensionally compatible with conventional storage stands, racks, bins, lockers, trunks, platforms, or other similar storage configurations typically found in and around golf courses and residences, and/or fits within travel storage containers or systems for traditional golf bags.

While certain novel features of this invention shown and described below are pointed out in the annexed claims, the invention is not intended to be limited to the details specified, since a person of ordinary skill in the relevant art will understand that various omissions, modifications, substitutions and/or changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus and method of the present invention solves the problems confronted in the art in a simple and straightforward manner.

One embodiment generally relates to sports equipment bags. More particularly, one embodiment relates to a bag with an integral wheeled transportation system that can be deployed, and retracted, and then stored within the confines of the bag. One embodiment may be used in connection with various sports that involve the use of clubs, sticks, bats, poles, or similar elongated devices in connection with the striking, hitting, or driving of circular, spherical, elliptical, or similar objects.

In one embodiment is provided a bag comprising a structural system of one or more substantially horizontal bands, more or less evenly spaced at multiple horizontal levels in relation to the bag, along with multiple vertical rods that provide skeletal structure and rigidity to the bag. In one embodiment the vertical rods intersect with vertical passages in the horizontal bands and connect at their upper terminus to a top cylindrical collar, and connect at their lower terminus to the base of the bag near the circumference of the base. The conjoined horizontal bands and vertical rods can provide structural support and rigidity to maintain the integrity and geometry of the bag, and to resist forces or loads imposed on the bag from the handling and transport of the assembly, or the removal or replacement of clubs, golf accessories, and personal items in the bag.

In one embodiment multiple wheels can be deployed from a recessed stowage compartment with one mechanical movement. In one embodiment deployment can be initiated by elevating a push/pull steering handle. In one embodiment the angle of the steering handle can be adjusted to best conform to the height of the golfer and to reduce the amount of external force needed to push or pull the golf bag. In one embodiment the bag may be rolled when the wheels of the golf bag are extended and locked in the deployed position. The bag can be moved to traverse pavement, stone, shell, brick, asphalt, wooden planks and similar man-made surfaces, as well as various types of organic and non-organic materials such as ground cover, grass, sand, pine straw, rock, stone, dirt, and other surfaces found on golf courses, play grounds, soccer fields, baseball fields, lacrosse fields, and other similar sports fields.

In one embodiment is provided a bag having an integral wheeled transportation system where the wheels are contained within the geometry of the club container portion (when the wheels are fully retracted). Multiple shapes can be used for the geometry of the club container portion such as circular, elliptical, rectangular, square, polygonal, or a combination thereof. In this embodiment, a cross section taken through the club container portion and projected downward toward the retracted wheels will contain the retracted wheels.

In one embodiment is provided a bag with an integral wheeled transportation system where wheels when retracted will not touch to ground.

In one embodiment is provided a bag including a recessed stowage compartment to conceal the multiple wheeled integral transportation system in a retracted position, as well as storage compartments for golf accessories and personal items.

One embodiment includes a golf bag with an integral wheeled transportation system whose overall dimensions of height or length, and diameter or girth, are consistent with the geometry of traditional golf bags, and which system facilitates and enhances the mobility, transportation, and storage of the golf bag and its contents, including without limitation, clubs and related golfing accessories and personal items, such as golf balls, tees, gloves, divot repair tools, ball retrieval devices, markers, pencils, score cards, scoring devices, tape, medical supplies, sun screen, eyeglasses, distance or range finders, global positioning devices, watches, jewelry, clothing, shoes, umbrellas, cell phones, tablets, and other related items.

In one embodiment is provided a bag having an integral wheeled transportation system which fits in conventional storage stands, racks, bins, lockers, trunks, platforms, and other similar storage configurations typically found in and around golf courses and residences, and also within travel containers or systems for traditional golf bags (when the bag includes clubs). This embodiment would include fitting a bag in a motorized golf cart.

In one embodiment is provided a bag with an integral wheeled transportation system where, during deployment and retraction of wheels, at least one wheel has a different type of movement than at least one other wheel. This can include linear movement of at least one wheel and arcuate type movement of at least one other wheel. In one embodiment at least two wheels can have arcuate type movement.

In one embodiment is provided a bag with an integral wheeled transportation system having three or more retractable wheels. In one embodiment at least one wheel can be a different size (diameter and/or thickness) than at least one other wheel. In one embodiment the wheels can be of the same size (diameter and/or thickness). Using three or more wheels has the advantage of distributing the load caused by the bag on the golf course and placing less of the load on each wheel (e.g., using three or more wheels as opposed to two wheels), enhancing transportation stability, and allowing transportation by pushing or pulling without having to exert force to cause the bottom of the bag to lift above the ground.

In one embodiment is provided a bag with an integral wheeled transportation system where at least one wheel can change its relative angle to its supporting leg during extension and/or retraction. One embodiment has at least one wheel aligning itself perpendicular to the ground at full extension of its supporting leg (alternatively, aligning regardless of the amount of extension). One embodiment allows at least one wheel to be mechanically (or rotatively) adjusted (and then fixed) at a set angle relative to its supporting leg so that it is perpendicular to the ground at full extension.

In one embodiment is provided a bag with an integral wheeled transportation system that allows for movement while maintaining full stability when the wheels are deployed and the bag is being pushed or pulled. This system can also be a push cart as opposed to only a pull cart. Additionally, the bag can be self stable when being pushed. Accordingly, in this embodiment the user is not required to tilt the system in advance of each movement, which tilting wastes energy, causes unnecessary fatigue, and tends to move the clubs and cause them to repeatedly hit each other (possibly causing damage).

In one embodiment is provided a bag with integral wheeled transportation system where a handle is operatively connected to the wheels by at least one gear. One embodiment includes multiple gears. In one embodiment teeth can intermesh (or interlock) with the gears.

In one embodiment is provided a bag with an integral wheeled transportation system where a handle is operatively connected to the wheels and has a pivoting system. Another embodiment allows the handle to pivot to accommodate multiple different preferred angles of a user and to maximize the effective pushing force applied by a user to the handle. Another embodiment allows the handle to be locked in various pivoting positions.

In one embodiment is provided a support system in the bag which supports (and/or restrains) and/or elevates the grips and clubs in the bag, thereby protecting the clubs during transport and play. This system can prevent the clubs from hitting each other and causing damage.

In one embodiment is provided a bag with an integral wheeled transportation system where clubs can be resistantly locked into position, such as by an upper rack section, so the clubs do not move and/or contact each other during movement. One embodiment includes receptacles on the top and bottom of the bag. One embodiment includes receptacles on the top having compressible and/or friction locks and/or clasps. One embodiment includes restraining devices on the top receptacles. One embodiment includes restraining members on the bottom receptacles.

In one embodiment is provided a bag with an integral wheeled transportation system including an internal space for storage having upper and lower sections where the lower section allows the heads or tops of the longer clubs to be stored at relatively the same level as shorter clubs (viewed from the side of the bag). One embodiment has the front of the bag being deeper than the rear. One embodiment has the wheels retracting into the rear section.

In one embodiment is provided a quick release/lock system for retraction and/or deployment of the integral wheeled transportation system. Another embodiment includes a locking system having teeth which interlock with at least one rod. In another embodiment the locking system includes a plurality of openings and pegs which interlock in the openings.

In one embodiment is provided a bag with an integral wheeled transportation system which includes a cleaning system, such as brush, system of brushes, or frictional device to clean the wheels being retracted and/or deployed.

In one embodiment is provided a bag with an integral wheeled transportation system equipped with ventilation/drainage openings, promoting the drying of the club ends, and/or drains the club storage compartment.

In one embodiment the exterior of the bag assembly incorporates conventionally available golf bag exteriors, such as metal, upholstered, and/or molded materials. In one embodiment the exterior finish also conceals and protects the integral wheeled transportation system when the system is retracted.

In one embodiment the bag assembly includes a plurality of compartments on its exterior, such as for storage of golf accessories and personal items. In one embodiment one or more of these compartments can use Velcro®, zippers, buttons, compression snaps, or hook and loop closure devices. In one embodiment the interior compartment of the bag can include pockets or other compartments accessible when the integral wheeled transportation system is deployed. In one embodiment, the bag assembly includes a self contained, removable compartment or compartments, with one or more of the features described above, which can be mounted on the exterior of the bag and used for the storage of golf accessories and personal items.

In one embodiment the integral wheeled transportation system can be contained in a golf bag of traditional height, internal diameter, and exterior girth without diminishing or functionally impinging upon the club storage area present in traditional golf bags. By maintaining traditional dimensions of a golf bag, one embodiment affords a golfer, who chooses to ride on a motorized golf cart, the ability to easily mount the bag on the recessed platform of a motorized golf cart, such as in the cart's golf bag retaining area or platform. In contrast, the rear of the cart or platform would not accommodate (without substantial modification) a traditional golf bag attached to an external or non-integrated rolling cart; a golf bag with permanently fixed and exposed wheels; or a golf bag with transportation system that included attachable and detachable wheels and related components.

In one embodiment a bag with an integral wheeled transportation system can be easily inserted and removed from the trunk or hatch of a vehicle without encountering operational hazards. Additionally, it occupies less space in a trunk or hatch of a vehicle than that occupied by a traditional golf bag attached to an external or non-integrated rolling cart; a golf bag with permanently fixed and exposed wheels; or a golf bag with a transportation system that includes attachable and detachable wheels and related components.

In one embodiment a bag with an integral wheeled transportation system can be stored in traditional golf bag storage stands, racks, lockers, bins, trunks, platforms, and other similar storage configurations typically found in and around golf courses and residences.

In one embodiment golfers who travel with a bag with an integral wheeled transportation system can still use travel containers or other systems for traditional golf bags.

In one embodiment the bag with an integral wheeled transportation system enables golfers to exercise by walking golf courses without having to expend energy tilting, lifting, and/or carrying a golf bag, clubs, golf accessories, and personal items.

One embodiment affords golfers the means to move a golf bag, together with its contents, including clubs, golf accessories, and personal items, without having to transport, assemble, rent or otherwise procure a separate piece of equipment, such as a cumbersome non-integrated rolling cart or a motorized golf cart.

In one embodiment incorporation of multiple wheels (preferably three) in the bag greatly enhances the mobility of the assembly. In one embodiment including at least one forward wheel and two rear wheels allows golfers the flexibility to either push or pull the assembly. Additionally, the golfer is not required to tilt the assembly to the rear and at an angle closer to the ground (such as required by two-wheeled golf bags). Additionally, with at least a forward wheel and two rear wheels, there is a greater distribution of weight and stability when traversing a course (which can reduce or minimize damage to golf courses from the weight and movement of the bag). Four or more wheels are also envisioned.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1A is a bottom view of the bag of FIG. 1.

FIG. 5A is a bottom view of the bag of FIG. 5.

FIGS. 12 and 12A is show a brush cleaning system for the wheels.

FIG. 13 shows an alternative embodiment for a pivoting handle along with an alternative embodiment for a quick release/lock mechanism.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
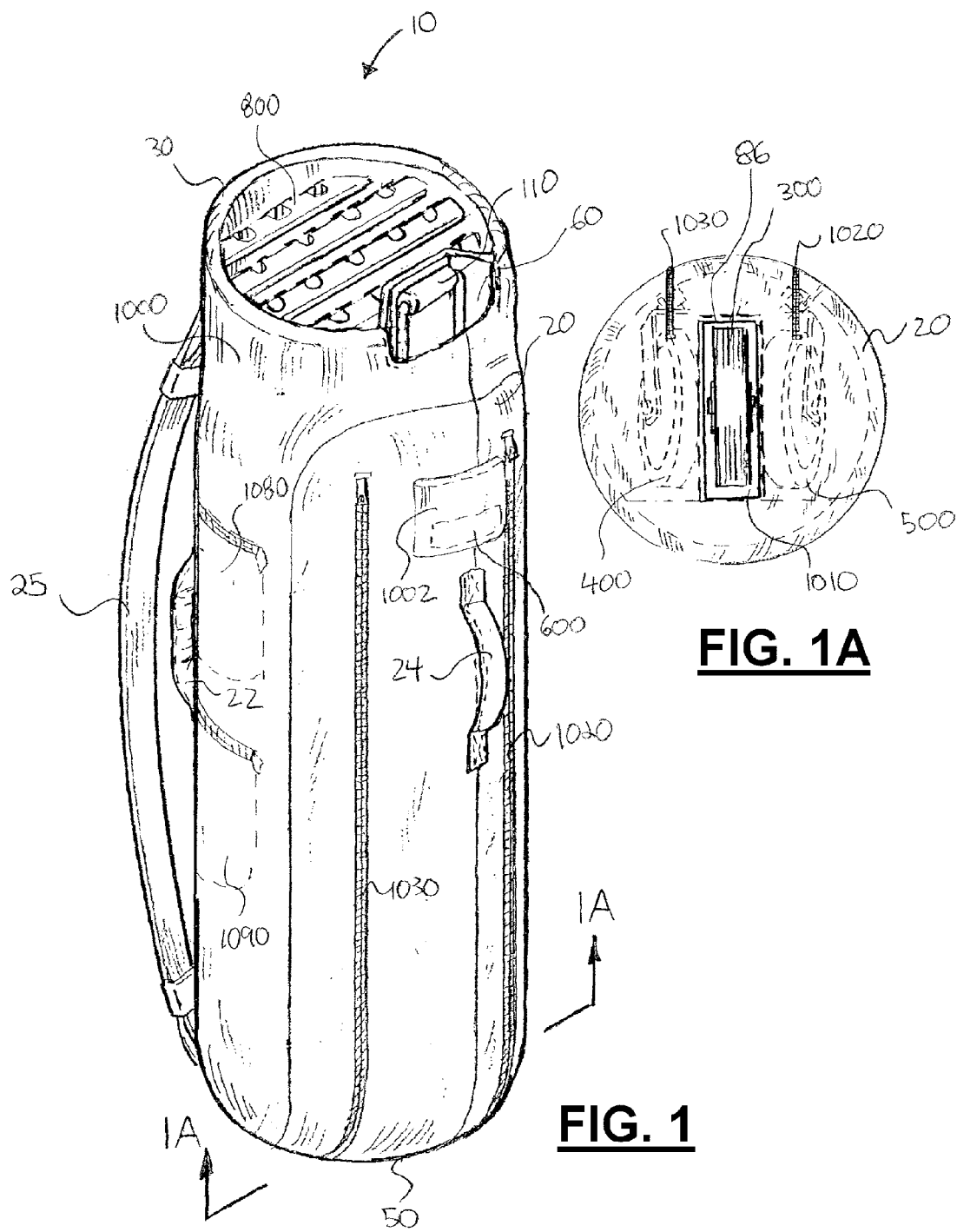
FIG. 1 is a perspective view of one embodiment of a sports bag with integral wheeled transportation system retracted.
Figure 2:
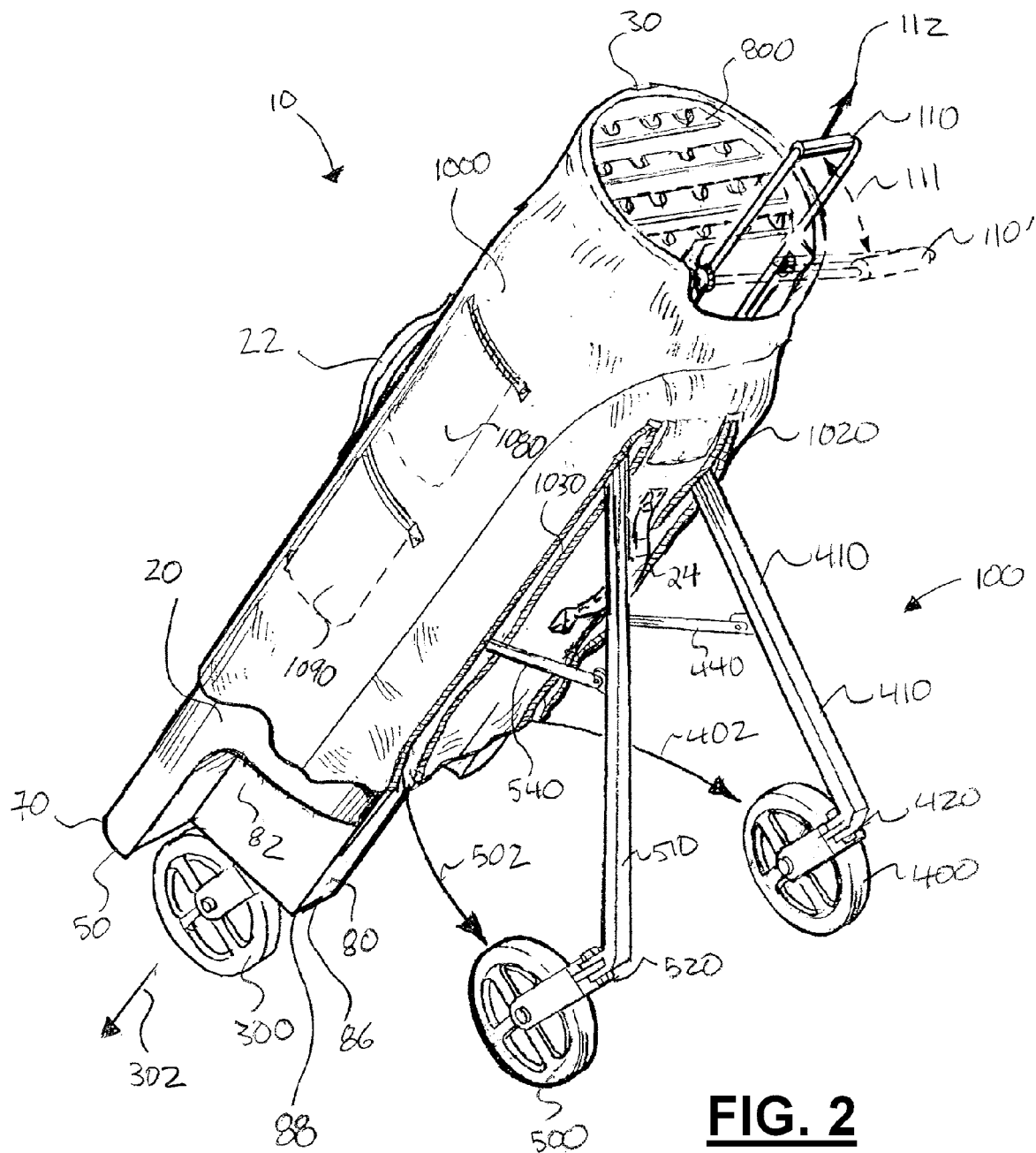
FIG. 2 is a perspective of the bag of FIG. 1, showing the integral wheeled transportation system deployed.
Figure 8:
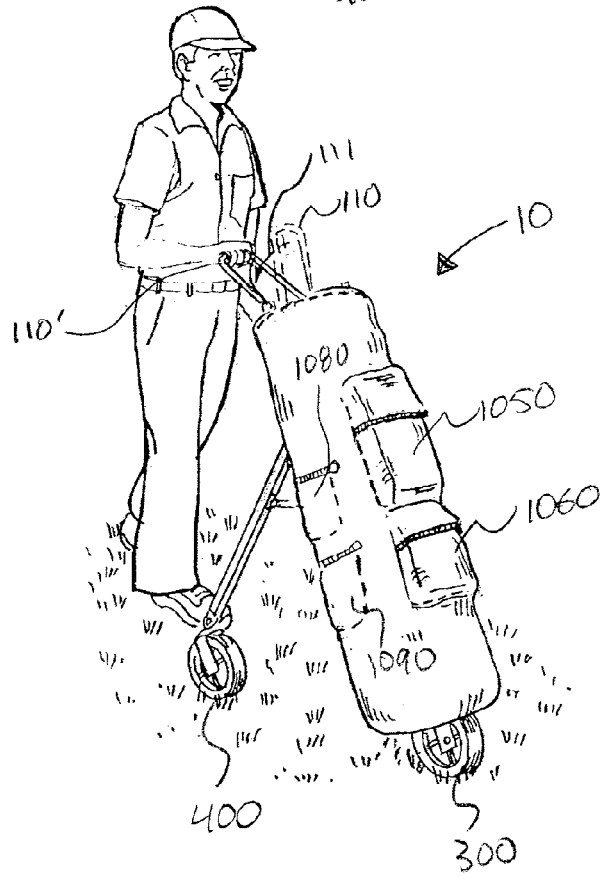
FIG. 8 shows an individual pushing the bag of FIG. 1 with the transportation system deployed.

FIG. 1 is a perspective view of one embodiment of a sports bag 10 with integral transportation system 100 shown in a retracted position. FIG. 1A is a bottom view of bag 10. FIG. 2 is a perspective of the bag 10, showing integral transportation system 100 deployed. FIG. 8 shows an individual pushing bag 10. When wheels 300, 400, and 500 are in fully deployed position, bag 10 can be rolled, by either pushing or pulling it, to traverse the natural ground, grass, asphalt or concrete pavement, stone, gravel, shell, brick and wooden planks or boards, as well as both organic and non-organic ground cover, such as straw, bark, stone, rocks, sand and other materials that are typically found on golf courses.

Figure 3:
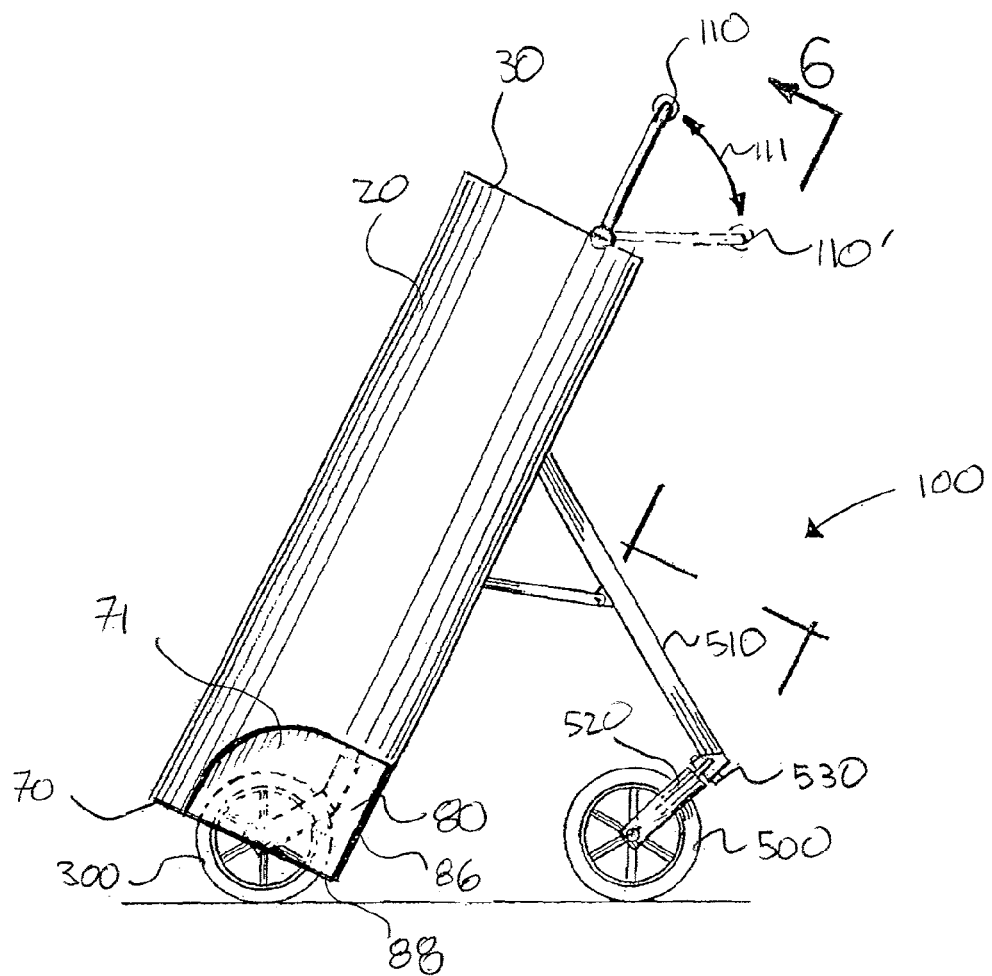
FIG. 3 is a side view of the bag of FIG. 1 (with cover removed), showing the integral wheeled transportation system deployed.
Figure 4:
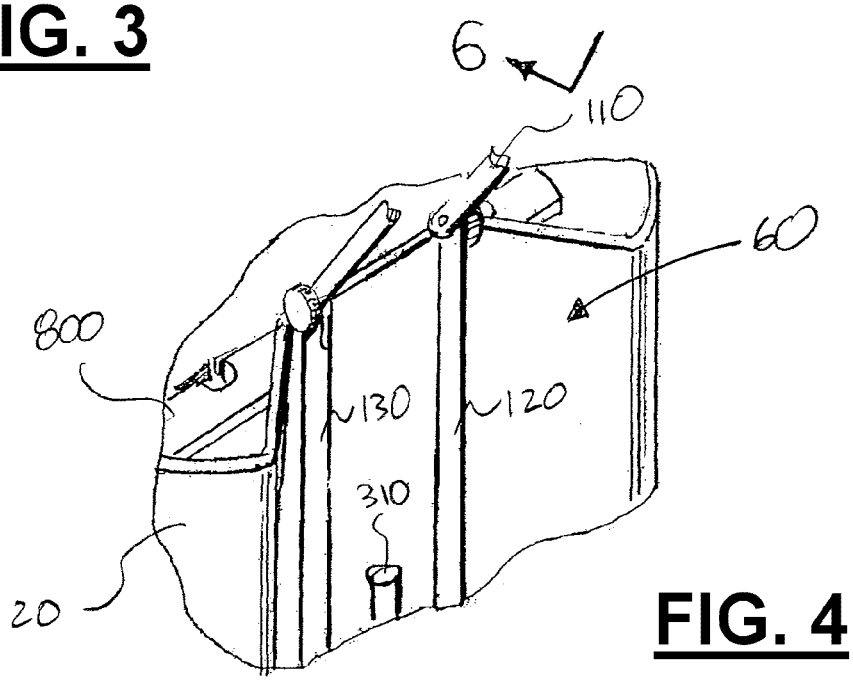
FIG. 4 is a closeup perspective view of a pivoting handle.

As seen in FIGS. 2 and 3, bag 10 can comprise body 20 and integral transportation system 100. Integral transportation system 100 can include handle 110 operatively connected to multiple wheels 300, 400, 500, and their associated equipment for deploying and retracting the wheels.

Figure 5:
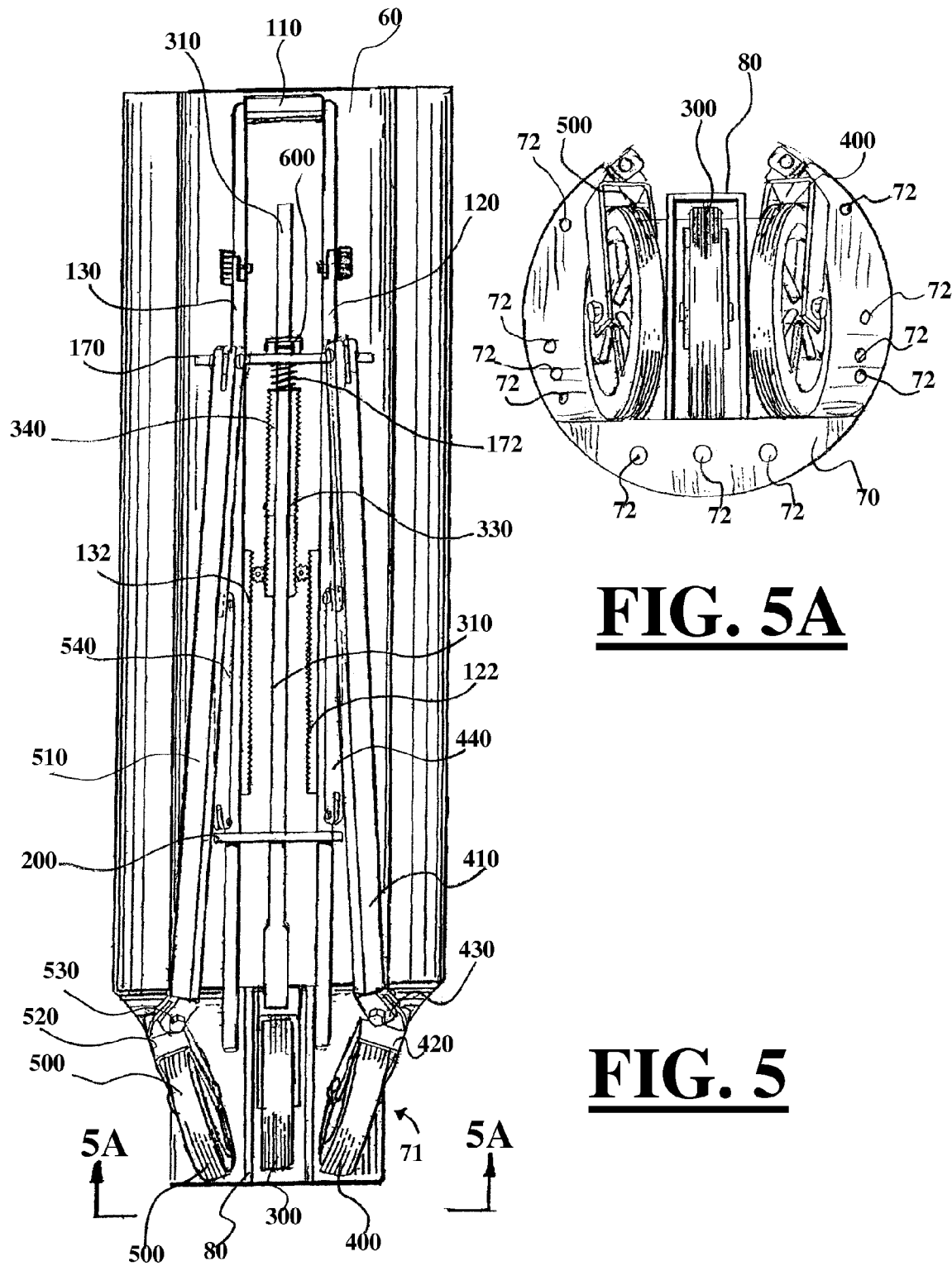
FIG. 5 is a rear view of the bag of FIG. 1 (with cover removed), showing the integral wheeled transportation system retracted.
Figure 6:
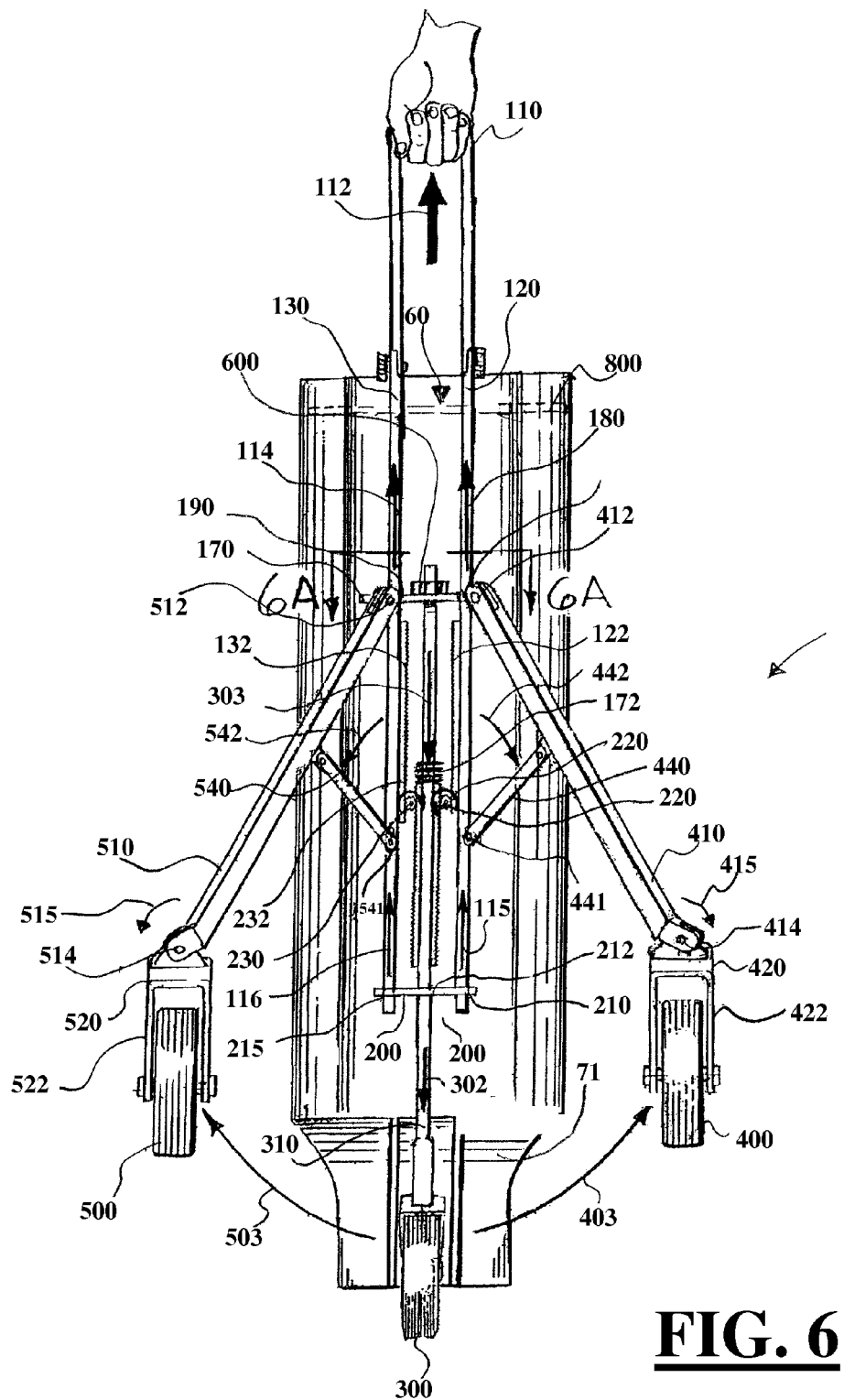
FIG. 6 is a rear view of the bag of FIG. 5 (with cover removed), showing the integral wheeled transportation system deployed.
Figure 6A:
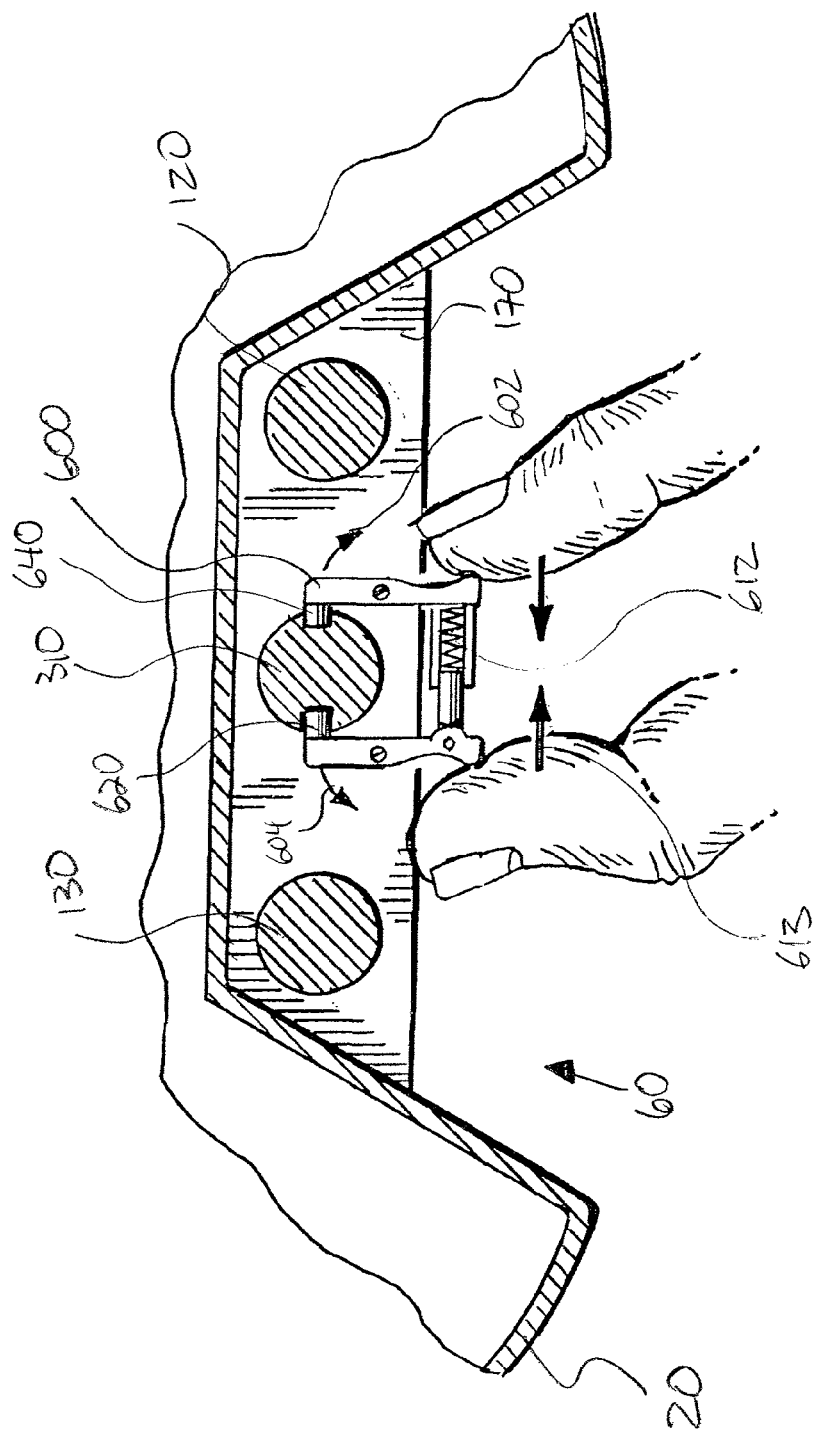
FIG. 6A is a top view of quick release/lock mechanism.
Figure 7:
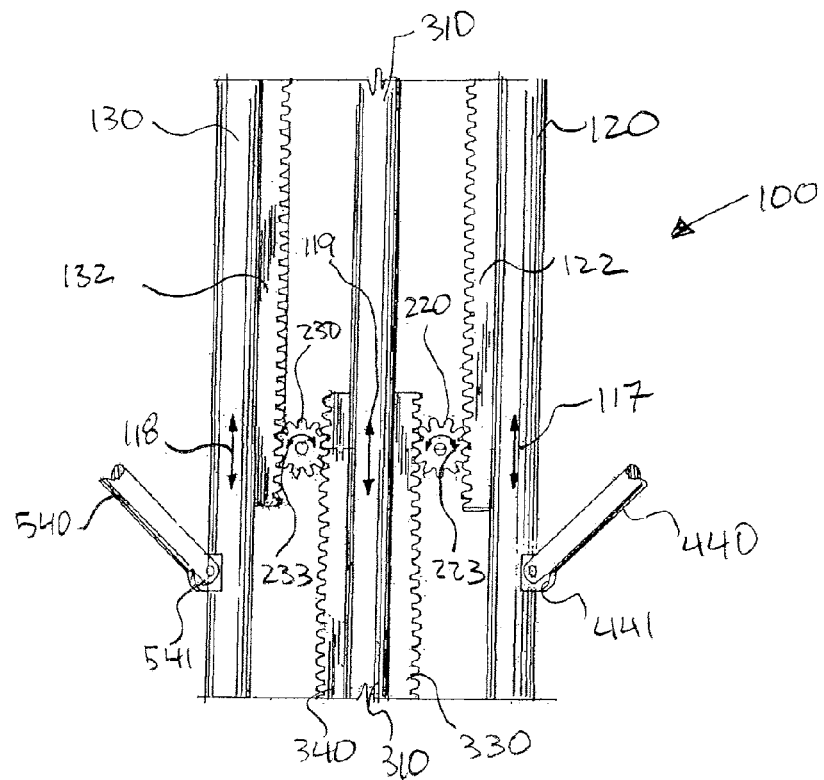
FIG. 7 is a closeup view of FIG. 5 showing one embodiment for a tooth and gear deployment/retraction mechanism suitable for the integral wheeled transportation system.

In one embodiment deployment and retraction can be accomplished using a single mechanical movement of steering handle 110 which is operably connected to wheels 300, 400, 500 (as seen in FIGS. 5-7). In one embodiment a quick release/lock 600 can be used to lock integral transportation system 100 in either the retracted or deployed position (as seen in FIGS. 5-6A).

FIGS. 2, 3, 5, 6, and 7 illustrate the mechanics of deployment and retraction of integral transportation system 100. FIG. 2 is a rear perspective view of bag 10, showing integral transportation system 100 deployed. FIG. 3 is a side view of bag 10 (with cover 1000 removed for clarity) also showing integral transportation system 100 deployed. FIG. 6 is a rear view of bag 10 (with cover removed), showing the integral transportation system 100 deployed. FIG. 7 is a closeup view of FIG. 5 showing one embodiment for a gear and tooth deployment/retraction mechanism suitable for integral transportation system 100. FIG. 5 is a rear view of bag 10 (with cover 1000 removed for clarity), showing integral transportation system 100 retracted.

As shown in FIG. 2 deployment can be achieved by pulling up on a handle 110 (in the direction of arrow 112) causing wheel 300 to move linearly in the direction of arrow 302, and at the same time causing wheel 400 to move arcuately in the direction of arrow 402, and wheel 500 to move arcuately in the direction of arrow 502. FIG. 6 is a rear view of bag 10 (with cover removed) showing integral transportation system 100 being deployed. Once integral transportation system 100 is deployed bag 10 can be caused to move in a desired direction by pushing or pulling on handle 110. FIG. 8 shows an individual pushing bag 10.

Retraction can be achieved by pushing handle 110 in the opposite direction of arrow 112, causing 300 to move linearly in the direction opposite of arrow 302, and at the same time causing wheel 400 to move arcuately in the direction opposite of arrow 402, and wheel 500 to move arcuately in the direction opposite of arrow 502. FIG. 5 is a rear view of bag 10 (with cover 1000 removed for clarity), showing integral transportation system 100 retracted. FIG. 5A is a view looking in the direction of line 5A-5A of FIG. 5, showing wheels 300, 400, and 500 in a retracted position. FIG. 1 shows that bag 10 is the same size as and appears similar in appearance to a traditional golf bag when integral transportation 100 system has been retracted.

As shown in FIGS. 5-7, deployment or retraction of wheel 300 can be respectively controlled by raising or lowering handle 110. Wheel 300 can be slidingly connected to bag 10 through opening 185 (in middle bracket 170) and opening 212 (in lower bracket 200). Leg 310 can comprise toothed area 330 and/or toothed area 340. Any of the toothed areas can be machined directly into leg 310 or can be added separately to leg 310. As shown in FIGS. 5 and 6, toothed area 330 (of leg 310) can be operatively connected to handle 110 through gear 220 and first rod 120 (where gear 220 intermeshes with toothed area 122 of rod 120). Toothed area 340 (of leg 310) can also be operatively connected to handle 110 through gear 230 and second rod 130 (where gear 230 intermeshes with toothed area 132 of rod 130). Any of the toothed areas can be machined directly into the rod or be added to the rods as separate sections. Although it is preferred to have leg 310 operatively connected to both first and second rods 120,130 (as it is believed such double connection increases stability), only one connection is required. As shown in FIG. 6, pulling handle 110 up in the direction of arrow 112 causes first rod 120 (along with toothed area 122) to move up (in the direction of arrow 113) and second rod 130 (along with s area 132) to move up (in the direction of arrow 114). Upward movement of toothed area 122 causes a counter-clockwise rotation of gear 220 (in the direction of arrow 222). A counter-clockwise rotation of gear 220 causes a downward movement (in the direction of arrow 303) of leg 310 ultimately causing wheel 300 to deploy downwardly in a linear direction as indicated by arrow 302. Similarly, an upward movement of toothed area 132 causes a clockwise rotation of gear 230 (in the direction of arrow 232). A clockwise rotation of gear 230 causes a downward movement (in the direction of arrow 303) of leg 310 ultimately causing wheel 300 to deploy downwardly in a linear direction as indicated by arrow 302. In FIG. 7 arrows 223 schematically indicate that gear 220 can rotate in both clockwise and counter-clockwise directions. Similarly, arrows 233 schematically indicate that gear 230 can rotate in both clockwise and counter-clockwise directions. Accordingly, leg 310 can move in both downward (deployment) and upward (retraction) directions (which is indicated by arrows 119).

As shown in FIGS. 5-7, deployment or retraction of wheel 400 can be respectively controlled by raising or lowering handle 110. Wheel 400 can be connected to leg 410. Leg 410 (at its upper end 412) can be pivotally connected to middle bracket 170. Arm 440 can operably connect leg 410 to first rod 120 through pivoting connections at both ends of arm 440. First rod can be slidingly connected to bag 10 through opening 180 (in middle bracket 170) and opening 210 (in lower bracket 200). As shown in FIG. 6, pulling handle 110 up in the direction of arrow 112 causes first rod 120 to move up (in the direction of arrow 113). Upward movement of first rod 120 causes an upward movement of end 441 of arm 440. An upward movement of end 441 causes arm 440 to rotate in the direction of arrow 442, which causes a deployment of wheel 400 in the direction of arrow 403. Because leg 410 is pivotally connected to middle bracket 170, deployment in the direction of arrow 403 is with an arcuate type movement. Retraction can be accomplished by a downward movement of handle 110 causing all movements to the opposite as stated in this paragraph.

As shown in FIGS. 5-7, deployment or retraction of wheel 500 can be respectively controlled by raising or lowering handle 110. Wheel 500 can be connected to leg 510. Leg 510 (at its upper end 512) can be pivotally connected to middle bracket 170. Arm 440 can operably connect leg 510 to second rod 130 through pivoting connections at both ends of arm 540. Second rod 130 can be slidingly connected to bag 10 through opening 190 (in middle bracket 170) and opening 215 (in lower bracket 200). As shown in FIG. 6, pulling handle 110 up in the direction of arrow 112 causes second rod 130 to move up (in the direction of arrow 114). Upward movement of second rod 130 causes an upward movement of end 541 of arm 540. An upward movement of end 541 causes arm 540 to rotate in the direction of arrow 542, which causes a deployment of wheel 500 in the direction of arrow 503. Because leg 510 is pivotally connected to middle bracket 170, deployment in the direction of arrow 503 is with an arcuate type movement. Retraction can be accomplished by a downward movement of handle 110 causing all movements to the opposite as stated in this paragraph.

In one embodiment deployment of wheels 300, 400, 500 can be operatively connected to a rotating handle (not shown in the drawings). Rotating handle can be located at the upper end 30 of body 20; being rotatively attached to body 20 and including a downwardly extending rod with worm gear that intermeshes with toothed area 122 (of first rod 120) or toothed area 132 (of second rod 130). As rotating handle is rotated in a first direction, its worm gear would intermesh with one of the toothed areas of first or second rods 120, 130, causing first and second rods 120, 130 to move either up or down (depending on the direction of rotation of rotating handle). Upward movement would deploy integral transportation system 100 and downward movement would retract integral transportation system 100. Additionally, the rotating handle could include a hinged section allowing the hand to turn into the interior of body 20 (such as in opening 852 or 854) when not in use (keeping the rotating handle out of the way when not used).

In one embodiment wheels 400 and 500 can be adjusted relative to legs 410 and 510 using fasteners 430 and 530 (schematically shown by arrows 415, 515) at articulating joints 414 and 514). FIGS. 2, 5, and 6 best show the rotative adjustability of wheels 400 and 500. In FIG. 6 arrows 415 and 515 schematically indicate that wheels 400 and 500 can be rotatively adjusted relative to articulating joints 414 and 514. Preferably wheels 400 and 500 would be adjusted so that all three wheels 300, 400, and 500 would be parallel to each other (and perpendicular to the ground) after deployment. Rotative adjustment allows a user to ensure that wheels 400 and 500 will be perpendicular to the ground regardless of the extent of deployment of integral transportation system 100. In one embodiment wheels 400 and 500 are respectively affixed to legs 410 and 510 (i.e., not rotatively adjustable relative to legs 410 and 510) so that wheels 400 and 500 are parallel to each other and wheel 300 (and perpendicular to the ground) after deployment.

In one embodiment a wheel alignment system is provided for wheels 400, 500 wherein the wheels automatically align themselves to being perpendicular to the ground after integral transportation system 100 is fully deployed. During retraction wheels 400, 500 can rotate inward (direction of arrows 415, 515 in FIG. 6) to facilitate storage of wheels 400, 500 in open area 71. Forks 420, 520 can be pivotally connected to legs 410, 510. Although not shown in FIG. 6, cables, wires, or other tethers attached to forks 420, 520 on the outsides 422, 522 of forks, running along (or inside) of legs 410, 510 to a termination points in recessed area 60 of body 20. Such action can be visualized in FIG. 6, however, cables, wires, or other tethers are not shown. When integral transportation system 100 deploys the attached cables, wires, or other tethers can cause wheels 400, 500 to pivot in directions opposite of the directions shown by arrows 415, 515 thereby causing wheels 400, 500 to end up perpendicular to the ground when fully deployed. The cables, wires, or other tethers can run through the interior legs 410, 510 or in sheaths connected to legs 410, 510. The cables, wires, or tethers can terminate at the inner side of the sheaths holding each wheel 400, 500. As legs 410,510 move from the retracted to the deployed position, the cables, wires, or tethers that operate in conjunction with each leg 410, 510 become taut. The stress placed by the cables, wires, or tethers cause forks 420, 520 (holding wheels 400, 500) to align themselves in a position parallel to the outer sides of body 20. When wheels 400, 500 are retracted, the cables, wires, or tethers become slack, resulting in each wheel 400,500 pivoting slightly inward in order to be easily received by each wheel's respective stowage compartment in open area 71.

In one embodiment the hub and tire of wheel 300 and the hubs and tires of wheels 400, 500 can be made in various diameters depending upon the overall size of the bag 10. The hub and tire of wheel 300, and the hubs and tires of wheels 400,500 can be constructed, for example, from a rubber, plastic, polymer or other strong, lightweight and impact resistant materials that can support the forces or loads imposed on or by bag 10, replete with clubs, golf accessories, and personal items, without experiencing any significant deformation. Wheel 300 and wheels 400, 500 can generate a low coefficient of friction when rolled, and are durable and not subject to degradation as a result of exposure to organic and non-organic materials and substances typically found on golf courses.

In one embodiment deployment of integral transportation system 100 can be mechanically assisted by a biasing member 172. As shown in FIG. 5, spring or biasing member 172 can be placed on leg 310 and compressed against middle bracket 170 when integral transportation system 100 is retracted. However, during deployment of integral transportation system 100 spring or biasing member 172 tends to push down on leg 310, which downward force is, in turn, transferred to an upward force on first and second rods 120, 130, thereby creating forces to assist in pulling up on handle 110 for deployment of rear legs 410, 510 and wheels 400, 500 connected to rear legs 410, 510 and front wheel 300 connected to leg 310. In an alternative embodiment spring or biasing member 172 can be connected to middle bracket 170 and also at some point on leg 310 so that when handle 110 is pulled up in the direction of arrow 112 (FIG. 6) member 172 will be stretched. Subsequently, when member 172 would tend to pull handle down in the direction of arrow 303 thereby assisting in retraction of integral transportation system 100. This alternative embodiment would ease retraction, but increase the difficulty of deployment as the resistance of member 172 would have to be overcome during deployment (however, such member assisting during retraction). In another alternative embodiment spring or biasing member could be in compression when integral transportation system 100 is fully retracted (which would assist in deployment from retraction) and in tension when the system is fully deployed (which would assist in retraction).

One embodiment has integral transportation system 100 being confined (in a retracted position) to the geometry of bag 10. As shown in FIGS. 1 and 5 when integral transportation system 100 is in a retracted position, none of the wheels 300, 400, 500 or their associated components extend beyond the geometry of golf bag 10. When retracted, integral transportation system 100 can be confined to the geometric dimensions of body 20. In the drawings, body 20 has been shown as having a circular cross section with recessed area 60 cut into the circular cross section. Additionally, body 20 has been shown with open area 71 in base 70 (see e.g., FIGS. 2 and 3). Looking at the circular cross section of body 20, it can be seen that the retracted integral transportation system 100 will not fall outside of the circle as the circle is moved from upper end 30 to lower end 50 of body 20. When retracted, first and second rods 120,130 can be contained in recessed area 60. Similarly, legs 310, 410, and 510 can be contained in recessed area 60. Wheels 300, 400, and 500 can be contained in open area 71. This unique geometry reduces the operational hazards associated with transferring bag 10 in and out of a vehicle trunk or hatch; allows for the placement of bag 10 on the recessed platforms on the rear of motorized golf carts; is dimensionally compatible with conventional storage stands, racks, bins, lockers, trucks, platforms or other similar storage configurations typically found in and around golf courses and residences; and fits within travel containers and systems for traditional golf bags.

In one embodiment steering handle 110 can be positioned at various angles (as shown in FIGS. 2-4, 8, and 9). Steering handle 110 can be essentially rectangular in shape. Its vertical and horizontal components can be constructed from a strong and rigid lightweight metal or plastic. Its inner opening can be sized to permit a hand to easily grasp steering handle 110 from almost any angle. Its rectangular shape can allow golfers to exert external force upon bag 10 (through integral transportation system 100) from a multitude of directions in order to push or pull the assembly. Alternate embodiments of steering handle 110 in the shape of a pull lever with or without the incorporation of a cross-sectional member, or in an oval or elliptical shape, are all possible. Additionally, steering handle 110 can be comprised of spaced apart ends (which are not touching each other). Steering handle 110 can be pivotally connected to first and second rods 120,130 allowing between 0 to 160 degrees (or 0 to 90 degrees) of rotation and capable of being unlocked and locked to adjust the height of the steering handle to a level that the golfer finds both comfortable and effective for applying external force to actuate the movement of bag 10. Arrows 111 in FIGS. 2, 3, 8, and 9 schematically indicate adjustability (and locking after adjustment) of handle 110. FIG. 8 shows an individually pushing bag 10 after handle 110 has been adjusted pivotally and locked in a desired position for the individual's comfort.

In one embodiment, bag 10 can include a quick release/lock mechanism 600 (shown in FIGS. 5, 6, and 6A). FIG. 6A is a closeup perspective view of one embodiment of quick release/lock mechanism 600. To maintain integral transportation system 100 in a retracted or deployed position, and to prevent the system from inadvertently opening or closing, spring loaded quick release/lock mechanism 600 can be fastened or affixed to body 20, for example, by rivets or other fasteners, such as on support plate 170. Quick release/lock mechanism 600 can comprise biasing member 612, along with plugs 620, 640 on each side of locking mechanism 600 for insertion into corresponding openings located in the sides of leg 310 for wheel 300. Squeezing biasing member 612 together in the direction of arrows 613 causes plugs 620, 640 to move respectively in the directions of arrows 602, 604. Releasing biasing member 612 causes plugs to move in the opposite directions of arrows 602, 604. A first pair of openings can be placed along the length of leg 310, into which plugs 620, 640 for quick release/lock mechanism 600 can be inserted to secure or lock integral transportation system 100 in the fully deployed position. A second pair of openings (not shown) can be placed (closer to wheel 300 compared to the first pair of openings) along the length of leg 310 securing integral transportation system 100 in the fully retracted position. Of course the spring-loaded quick release/lock mechanism 600 may also be located in such position as to be used to lock second rod 130 and/or first rod 120 in addition to (or in place of) leg 310 depending upon the desired geometry of bag 10. As shown in FIG. 1 quick release/lock mechanism 600 can be located under cover 1000 and hidden from view by flap 1002.

Figure 9:
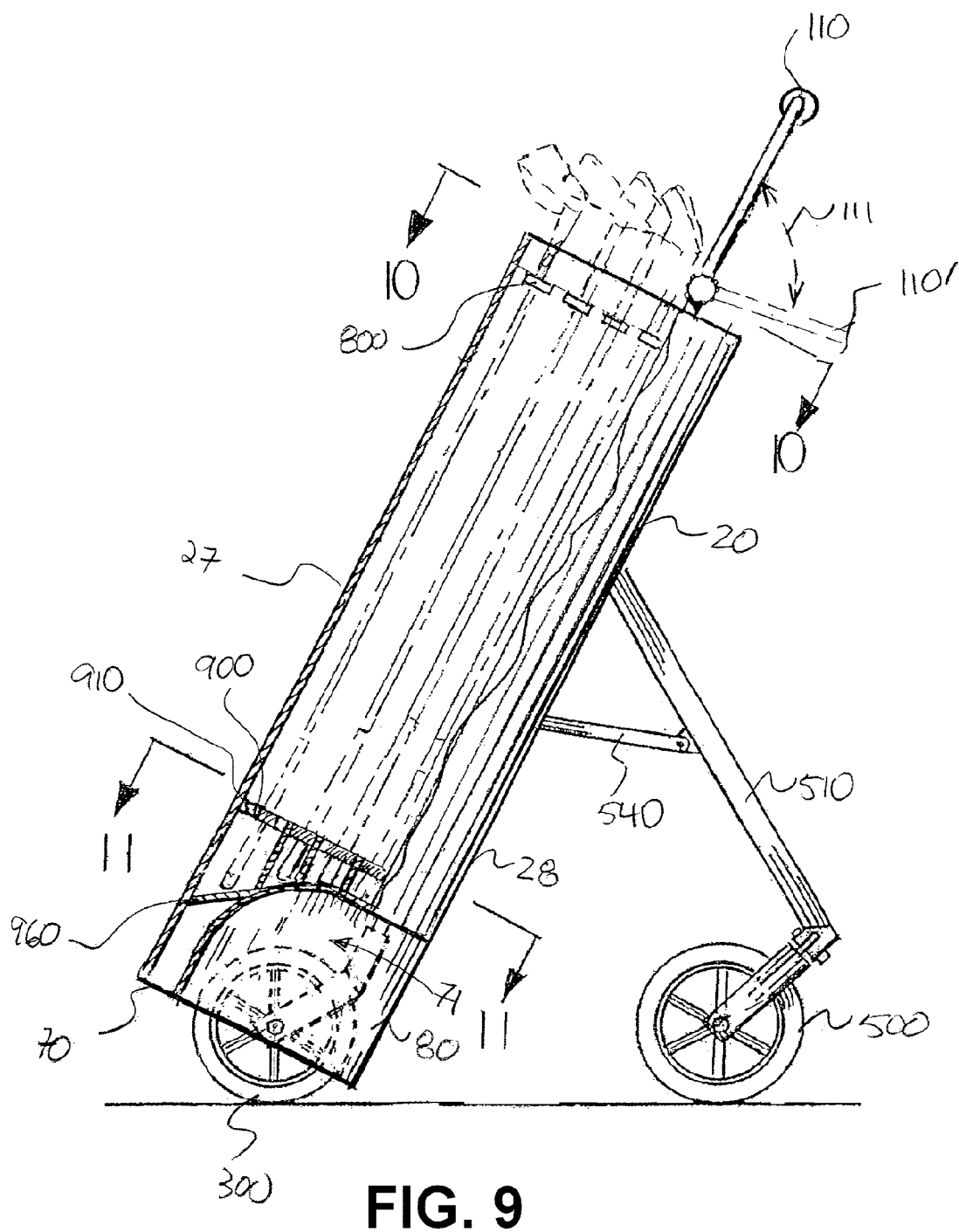
FIG. 9 is a partial sectional view of the bag (with cover removed) of FIG. 3 showing the upper and lower racks supporting a plurality of clubs.
Figure 10:
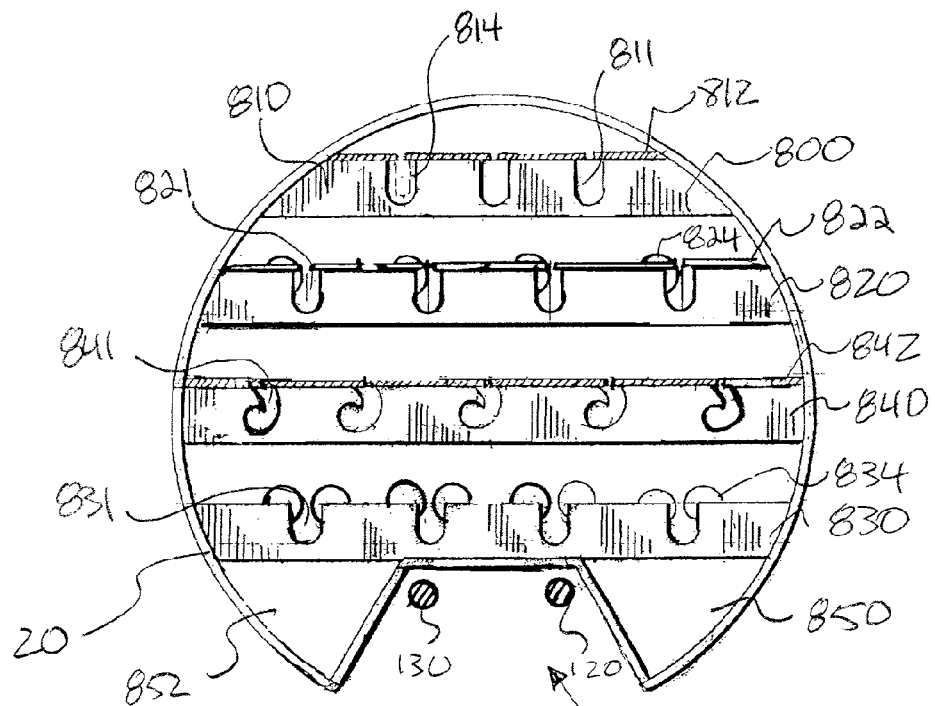
FIG. 10 is a top view of the upper rack showing various embodiments for club restraint systems.
Figure 11:
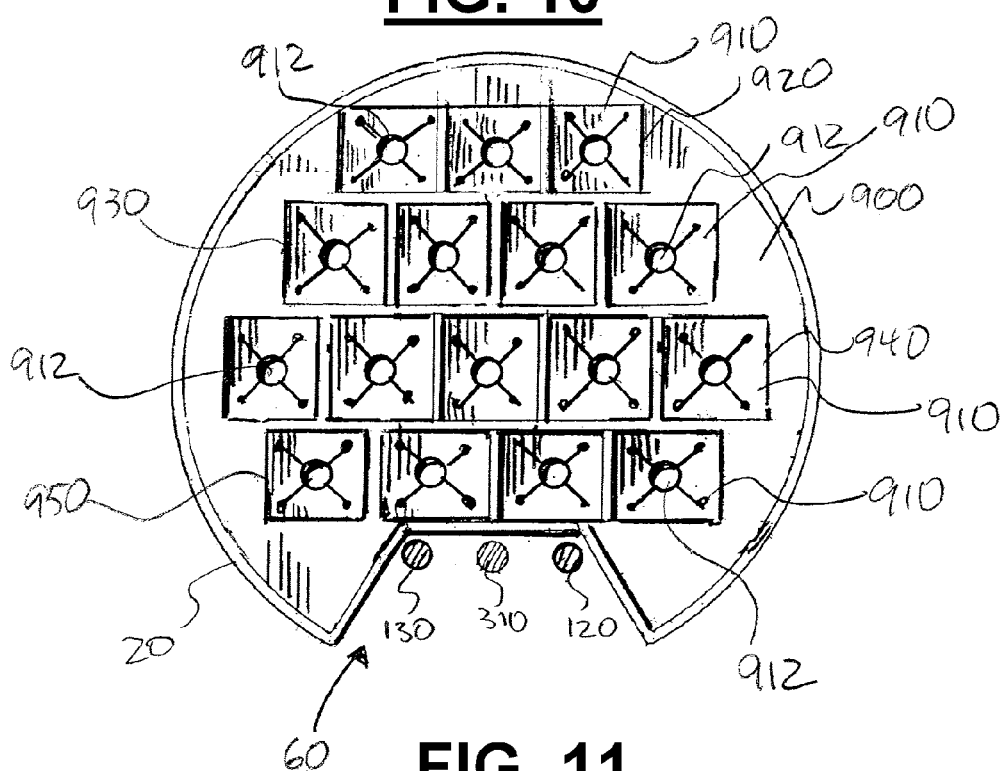
FIG. 11 is a top view of the lower rack showing an embodiment of a club grip end restraint system.

In one embodiment, bag 10 can include a club support system which can lock clubs into place. FIG. 9 is a partial sectional view of bag 10 showing upper and lower racks 800, 900 supporting a plurality of clubs. FIG. 10 is a top view of upper rack 800 showing various embodiments for club retainer systems. FIG. 11 is a top view of lower rack 900 showing one embodiment of a club retainer system. Clubs placed in bag 10 can be restrained and/or supported by upper and lower racks 800, 900.

Upper rack 800 can include beams 810, 820, 830, and 840 each having a plurality of dividers for holding golf clubs. Although shown as comprised of a plurality of beams, upper rack can take various forms, such as a single member with a plurality of openings for golf clubs. Preferably, the number total plurality of slots is between 14 and 16. The plurality of dividers can have different configurations, and one or more of the dividers can include resistance members to restrain movement of golf clubs placed in the slots. Different configurations of resistance members and/or biasing members can be used on different configurations of dividers. Examples of various types of dividers, resistance members, and/or biasing members are shown on beams 810, 820, 830, and 840. Beam 810 shows a plurality of dividers 811, each having resistance member 812. Resistance members 812 can be rubber, foam rubber, flexible plastic, or other types of materials which will allow placement of a club through a gap in a resistance member 812. In an alternative embodiment a second type of resistance member 814 can be used (as shown being located along the edges of one of the dividers of beam 810). Resistance member 814 can be of similar material to resistance member 812, and squeeze the shaft of the golf club inserted into the divider on which resistance member 814 is placed. Beam 820 shows plurality of dividers 821, each having a resistance member 822 and biasing member 824. Beam 830 shows plurality of dividers 831, each having double biasing member 834. Beam 840 shows plurality of dividers 841 (which can be semi-circular, arced, S-shaped, or other irregular shapes), each having resistance member 842. The dividers can include openings in a semi-circular or other shape for the placement of clubs to restrain the movement of the clubs at the shaft and thereby prevent the clubs from contacting one another. Although not necessarily shown in each embodiment of a divider, if desired, biasing members, double biasing members, and/or resistance members can be used to confine a club placed in a particular divider. Additionally, it is preferred that a single type of divider, resistance and/or restraining member, and/or biasing member is used for a particular upper rack 800.

The upper end of body 20 can include openings 850 and 852 (and/or 854) which can be used for storage of items other than clubs.

Lower rack 900 can include row of plurality of openings 920, row of plurality compartments 930, row of plurality of compartments 940, and row of plurality of compartments 950. Lower rack 900's individual compartments can correspond to particular dividers in upper rack 800. Such correspondence can keep clubs orderly when placed in bag 10. Rack 900 can have a resistance member 910 with a plurality of openings 912 corresponding to the individual compartments and allowing a grip end to pass but restraining the grip ends of clubs to deter lateral and/or rotational movement in the grip ends of clubs. Resistance member 900 can be constructed of a rubber, foam rubber, flexible plastic, or other types of materials which will allow placement of a club through the rubber but tends to restrain rotational movement. Preferably, resistance member, where foam rubber is used will have a thickness between ½ and 1 inch, more preferably between ⅝ and ¾ inches. Alternatively individual resistance members 910, 910', 910", etc. can be used in each compartment. In rack 900 an assortment of compartments can be used having sufficient length, width, or diametrical dimensions to accept and/or restrain the grip ends of clubs and thereby deter lateral and/or rotational movement in the grip ends of clubs, such as when bag 10 is lifted, carried, rolled, dropped, or experiences jerking forces. Compartments can be constructed in a square, rectangular, or circular shape from, for example, a plastic, polymer or other strong, lightweight and impact resistant material. One embodiment includes a system allowing both longer and shorter clubs to be kept at substantially one height as seen from the side of bag 10. In one embodiment (shown in FIG. 9) an internal lower support plate 960 can be used in cooperation with lower rack 900 to maintain clubs of different lengths at substantially one height. Support plate 960 can have a plurality of openings for assisting in ventilation/drainage of the interior of body 20 in case of rain or where water enters interior of body 20. As shown in FIG. 9 support plate 960 can have an upward slope from front 27 to rear 28 of body 20. The slope in support plate 960 can allow for the storage of shorter clubs at a height near or equal to the height of longer clubs (shorter clubs being placed closer to rear 28 and longer clubs being placed closer to front 27). In an alternative embodiment lower rack 900 and support plate 960 can be combined wherein lower rack itself would have an upward slope from front 27 to rear 28 of body 20. In another alternative embodiment the bottom of body 20 itself can be used as the upward sloping surface (e.g., above area 71). The front 27 of base 70 (for body 20) can be lower than the rear 28. Base 70 (of body 20) can slope upwardly from front 27 to rear. This slope can be linear, curvilinear, or other type of slope. The slope in base 70 (at the top of open area 71) can allow for storage of longer clubs at a height near or equal to the height of shorter clubs. Longer clubs can be placed closer to front 27 while shorter clubs can be placed closer to rear 28.

One embodiment includes ventilation/drainage openings for the interior of bag 10. As shown in FIG. 5 a plurality of ventilation/drainage openings 72 can be placed in base 70 of body 20 (and/or at other locations of body 20). Such ventilation/drainage openings facilitate ventilation of the club storage area, the drying of grip ends of clubs and the drainage of the interior of bag 10 in the event of inclement weather.

One embodiment includes a means for allowing bag 10 to stand upright when integral transportation system 100 is retracted. As shown in FIGS. 1A, 2, 3, and 9, containment box 80 can contain wheel 300 and be attached to base 70 of body 20. It should be noted that box 80 is optional and can be omitted if desired. Box 80 can comprise side walls 82, 84, rear wall 86, and base 88. As shown in FIG. 1A base 88 can be open allowing wheel 300 freely to deploy and retract. Base 88 in combination with base 70 can be used to provide support when standing bag 10 in an upright position. Base 88 and base 70 would form a T-support for supporting bag 10 in an upright position. In one embodiment the interior of box 80 can be open to the interior of body 20 (which could assist in ventilating and draining body 20). In one embodiment the interior of body 20 is not open to the interior of box 80. Although not shown, in one embodiment a plate can be extended from rear wall 86 of box 80 to the rear 28 outer circumference of body 20 (which plate should provide further support for standing bag 10 upright). Although also not shown, in one embodiment sidewalls 82, 84 (from front 27 to rear 28 of body) can be angled (sloped or curved) from base 88 toward the upper end 30 of body 20 to allow more space for bag 10 to traverse uneven areas. Other support embodiments for bag 10 are envisioned, such as extending a flat plate from base 70 to the rear 28 of body 20. The flat plate could be shaped to conform with the cross sectional shape of body 20. An opening in the flat plate could be provided for allowing wheel 300 to retract and deploy. Wheels 400 and 500 would retract and deploy above the flat plate as the plate could be positioned below their lowermost point during retraction. Side supports could be used to reinforce the flat plate toward rear 28 of body 20. Another embodiment envisions making body 20 substantially extend to base 70 for its entire cross section and including openings for retraction and deployment of wheels 300, 400, 500 along with their associated linkages.

One embodiment includes a cleaning system for wheels 300, 400, and 500. FIG. 12 is a rear view of a cleaning system for wheels 300, 400, 500. Brush 700 can be used for wheel 300, brush 710 for wheel 400, and brush 720 for wheel 500. Brushes 700, 710, and 720 or other frictional devices can come into contact with their respective wheel 300, 400, 500 as each wheel is retracted and/or deployed during retraction and/or deployment of integral transportation system 100. Through physical agitation, brushes 700, 710, 720 can dislodge or otherwise remove dirt, debris and other particles from wheels 300, 400, 500. Multiple deployments and retractions of integral transportation system 100 can be used to more thoroughly clean wheels 300, 400, 500. Alternative type brushes can be used such as long bristles made of natural or artificial materials. In an alternative embodiment a frictional device is used as the cleaning system, which can be comprised of bristles (metal, plastic, wood, rubber, polymers, other materials) for cleaning the wheels.

FIG. 13 is an alternative embodiment for a pivoting handle 1600 along with an alternative embodiment for a quick release/lock mechanism 600'. The pivoting mechanism can comprise knob 1640, toothed connector 1660, toothed connector 1660, locking pivot 1610, toothed connector 1620, and toothed connector 1630. Handle 1600 can be attached to toothed connectors 1630, 1660. Toothed connectors 1630, 1660 detachably connect to toothed connectors 1620, 1650. Handle 1600 can be pivoted relative to first and second rods 120,130 by loosening knob 1640 which disconnects toothed connectors 1630, 1660 from toothed connectors 1620, 1650. After loosening handle 1600 can be pivoted in the direction of arrows 1602 to a desired orientation. Handle 1600 can then be locked by tightening knob 1640 thereby connecting again toothed connectors 1630, 1660 to toothed connectors 1620, 1650.

FIG. 13 also shows an alternative embodiment for quick release/lock mechanism 600'. Quick release/lock mechanism 600' can include rods 620, 630 which detachably connect to toothed areas 124, 134 of first and second rods 120, 130. Activation mechanism 610 can be biased (such as by a spring) so that rods 620, 630 extend outwardly at rest and detachably connect to toothed areas 124, 134. To detach rods 620, 630 activation mechanism 610 can be squeezed inwardly moving rods 620, 630 away from toothed areas 124, 134. When released, handle 1600 can be moved up or down (respectively deploying or retracting wheels 300, 400, and 500). At the desired elevation of handle 1600 activation mechanism 610 can be released causing the biasing means to push outwardly rods 620, 630 which again connect to toothed areas 124, 134 thereby locking first and second rods 120, 130 at the chosen elevation.

In one embodiment, the height of bag 10, when being used as a golf bag, is preferably about between about 31 to 41 inches, more preferably between about 35 to 37 inches, and more preferably about 36 inches. A circular cross section is preferred for bag 10 which is preferably between about 7 to 12 inches, more preferably between about 8 to 11 inches, and more preferably 10¾ inches. However, other cross sectional shapes can be used, such as elliptical, oval, rectangular, square, and polygonal, or a combination of two or more of these shapes.

In one embodiment bag 10 can include an internal structural system which includes a plurality of horizontal bands, which can be spaced evenly at horizontal levels about the height. Additionally, multiple vertical rods can be used as a skeletal framework providing rigidity to bag 10, such as where a soft material is used for the exterior of body 20 of bag 10. The vertical rods and horizontal bands can be interconnected providing a structural frame for bag 10. Acceptable materials should be selected based on loads to be encountered and can include, but are not limited to, metal, plastic, polymers, wood, etc.

FIGS. 1, 1A, 2, and 8 show a preferred embodiment of bag 10 having a cover 1000. Cover 1000 may be constructed of any durable and lightweight material such as, for example, plastic, nylon, polypropylene, canvas, fabric, or other similar material that can withstand natural elements and the terrain and substances normally encountered on a golf course. Cover 1000 can envelope integral transportation system 100 when system 100 is in the retracted position. Cover 1000 can include passages located in the rear side 28 of bag 10, which passages can be opened and closed with zippers 1020, 1040 or other devices, permitting the deployment of wheels 400, 500 and associated equipment of the integral transportation system 100. Cover 1000 can include opening 1010 permitting deployment of wheel 300. Although not shown opening 1010 can include a zipper or other device for closing opening 1010. In different embodiments Velcro®, buttons, compression snaps, or hook and loop closure devices can be used. In one embodiment openings can be used which do not have any closure devices. FIG. 8 shows an alternative cover 1000' which includes stowage compartments 1050, 1060. Although not shown in FIG. 8, handle 22 and strap 25 (seen in FIG. 1) can also be attached such as on the side of compartments 1050, 1060.

Figure 15:
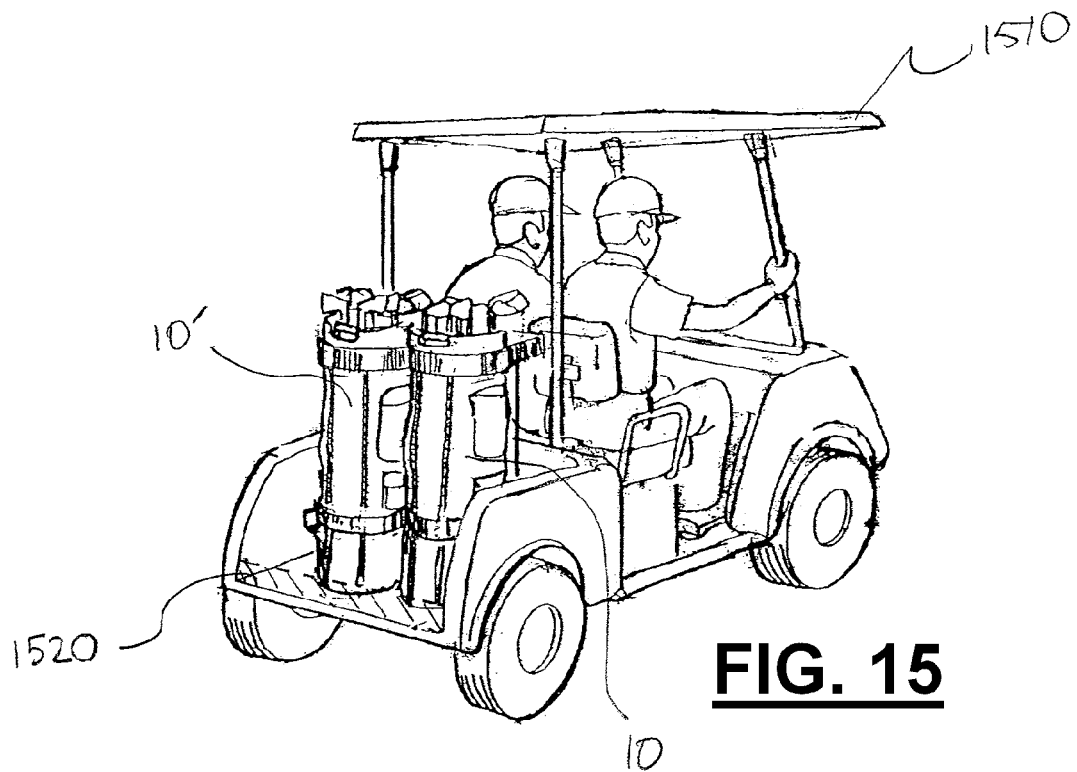
FIG. 15 shows two bags similar to FIG. 1 in a motorized golf cart.

Bag 10 may incorporate carrying strap 25 or hand grips 22, 24 allowing a golfer or caddy to carry bag 10 when the golfer chooses not to deploy integral transportation system 100 or to easily mount the golf bag assembly on the rear of a motorized golf cart. FIG. 15 shows two bags 10, 10' being transported in motorized golf cart 1510. In one embodiment, to prevent rain from entering the tops of bags 10,10', an overhead awning can be attached to the roof of motorized golf cart 1510, which limits vertical club pull space and precludes mounting bags with external wheels or with any portion of the wheels exposed from being suitable for mounting and use on motorized golf carts. Raised area 1520 can be included in motorized golf cart 1510.

Figure 14:
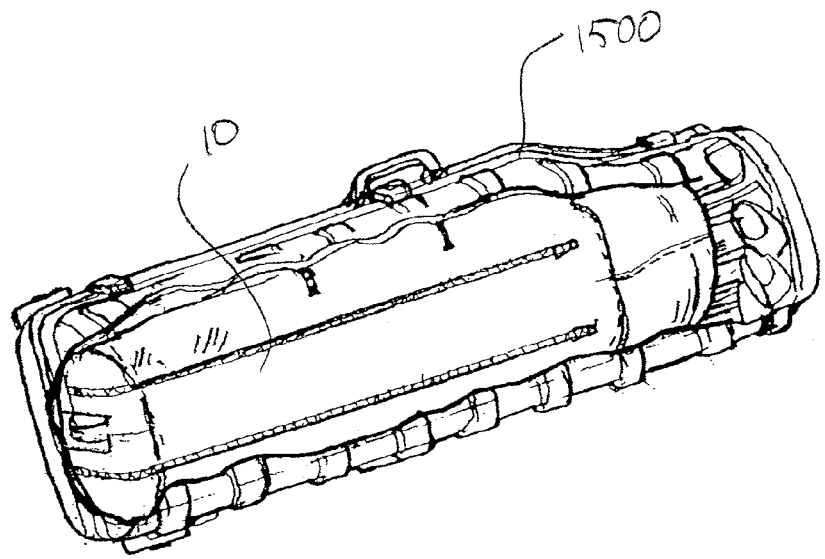
FIG. 14 shows the bag of FIG. 1 in a travel container.

One embodiment allows bag 10 to fit inside a traditional travel case. FIG. 14 shows bag 10 fitting in travel case 1500. Because bag 10 substantially maintains traditional golf bag dimensions, no specially sized travel case need be purchased.

Additional embodiments of bag 10 may incorporate any number of supplementary features used to assist a golfer or caddy during a round of golf. Additional features contemplated include, but are not limited to, a motor driven mechanism to provide assistance in overcoming initial and other frictional forces encountered in connection with the movement of the golf bag assembly. Additionally, bag 10 can include a global positioning device (GPS) to provide accurate distance and location measurements to the golfer while engaged in playing a round of golf. Other features include dedicated range finders, mobile computing devices, and mobile communication devices. These features may be powered by a rechargeable battery or by a solar or mechanical generator coupled to the wheel system of bag 10.

Sliding Embodiment

FIGS. 16-28 show an alternative embodiment of the sports bag with integral transportation system 100'. In these figures the cover 1000 has been omitted for clarity.

Figure 16:
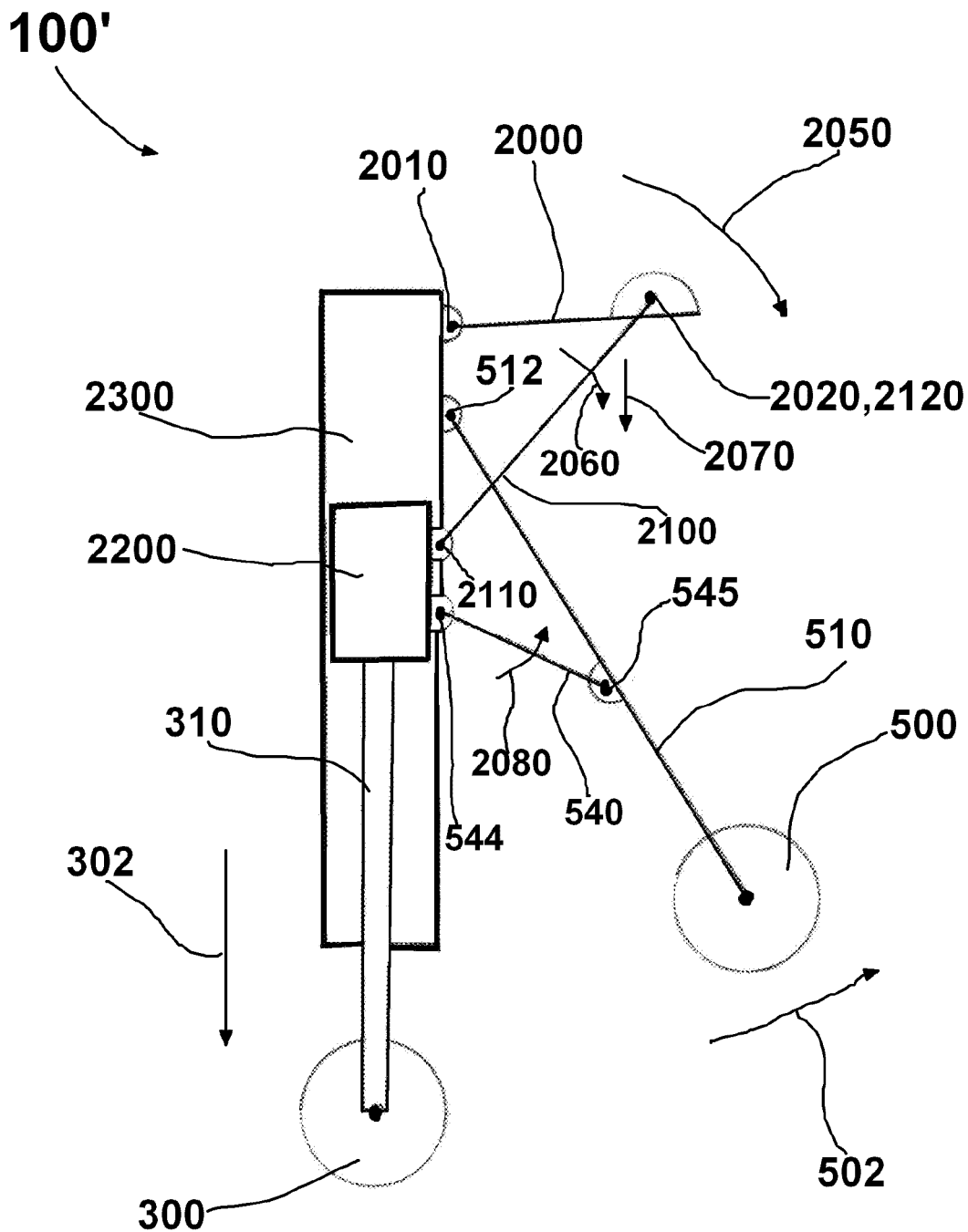
FIG. 16 is a schematic view of another embodiment of the deployment and retraction system which includes a sliding member in a sliding housing.
Figure 17:
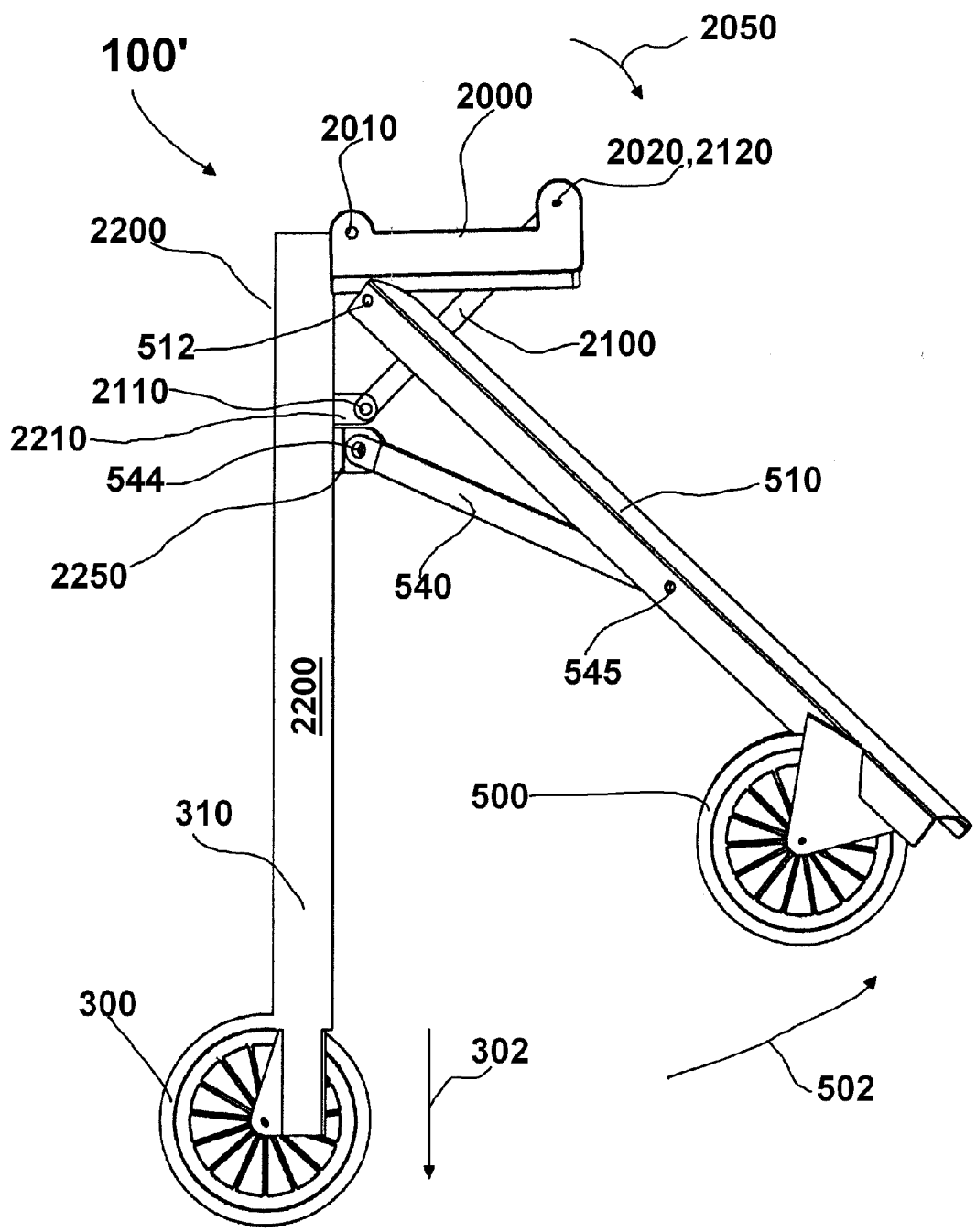
FIG. 17 is a side view of the deployment and retraction system schematically shown in FIG. 16, and shown in an extended state, where the sliding housing has been omitted for clarity.
Figure 18:
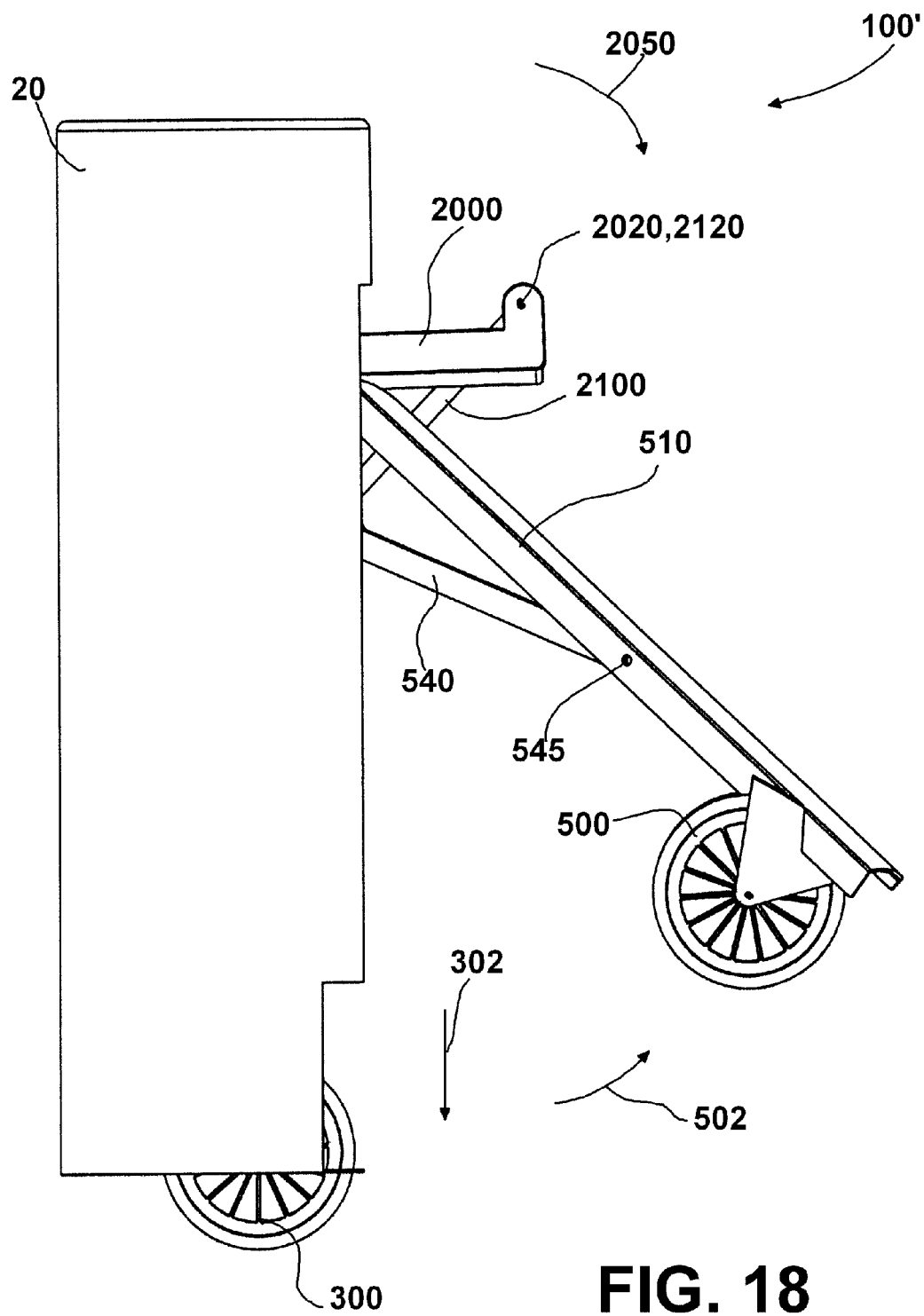
FIG. 18 is a side view of a sports bag with integral wheeled transportation system of FIG. 17 shown in an extended state.
Figure 19:
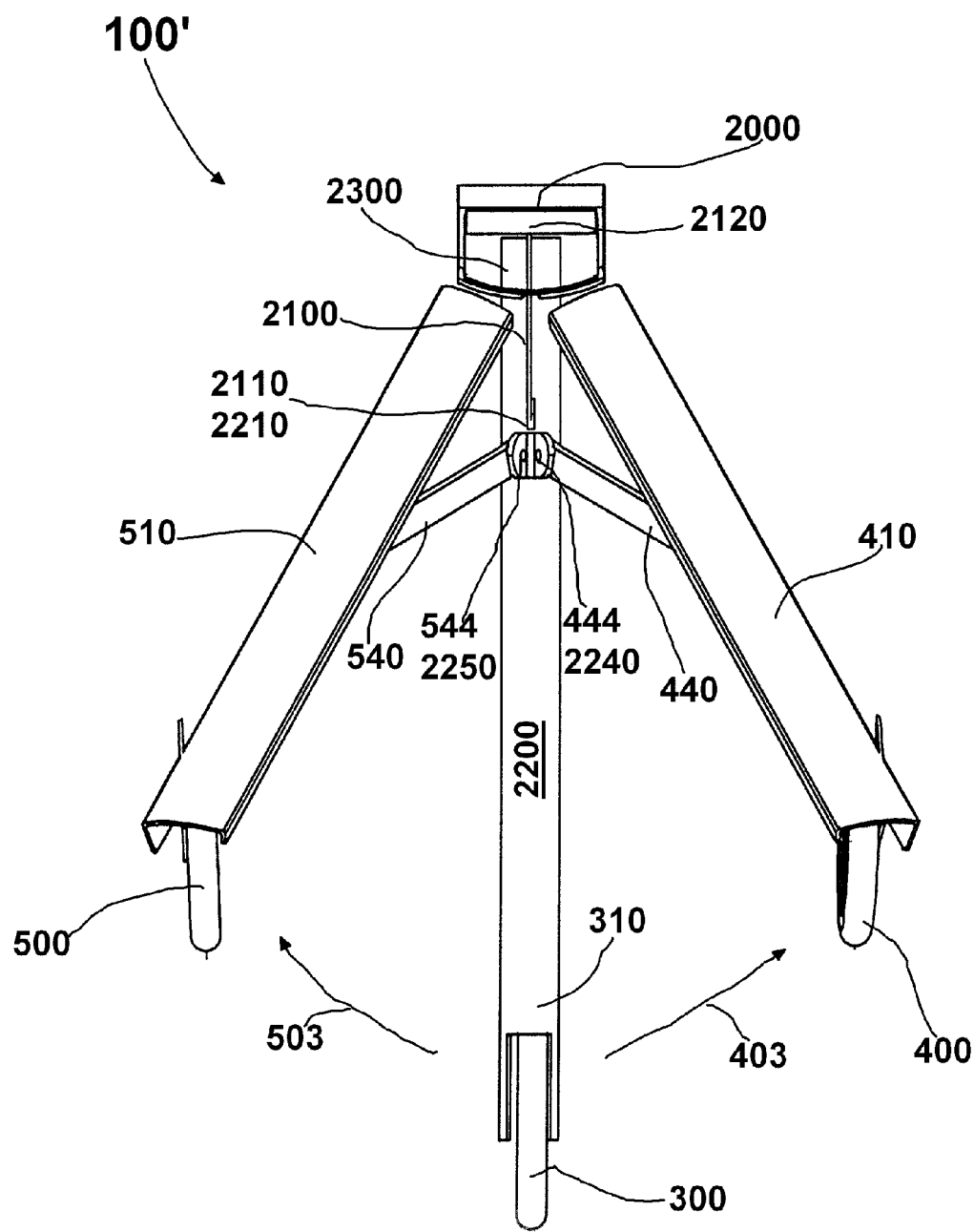
FIG. 19 is a rear view of the deployment and retraction system schematically shown in FIG. 17, and shown in an extended state, where the sliding housing has been omitted for clarity.
Figure 20:
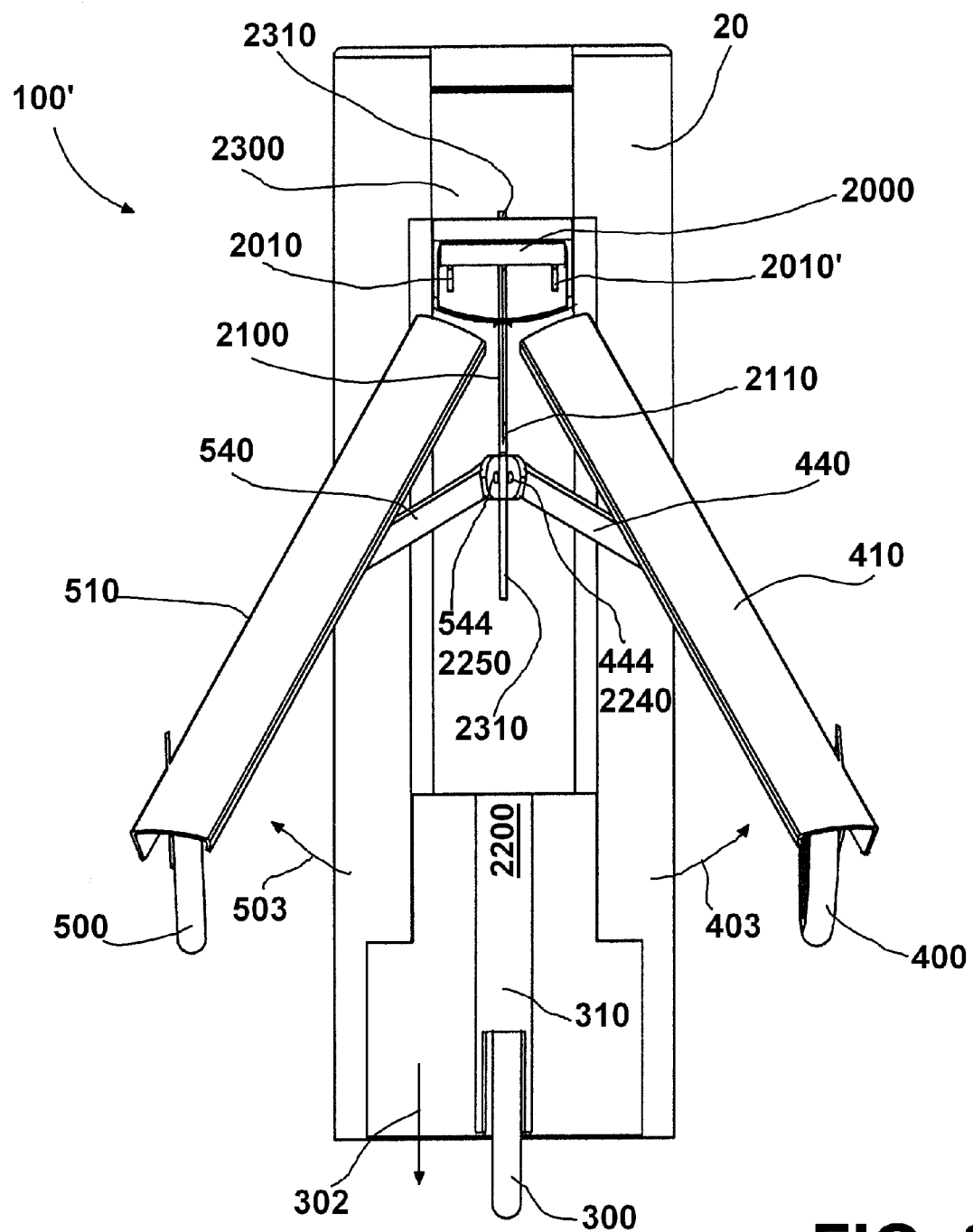
FIG. 20 is a rear view of a sports bag with integral wheeled transportation system of FIG. 17 shown in an extended state.
Figure 21:
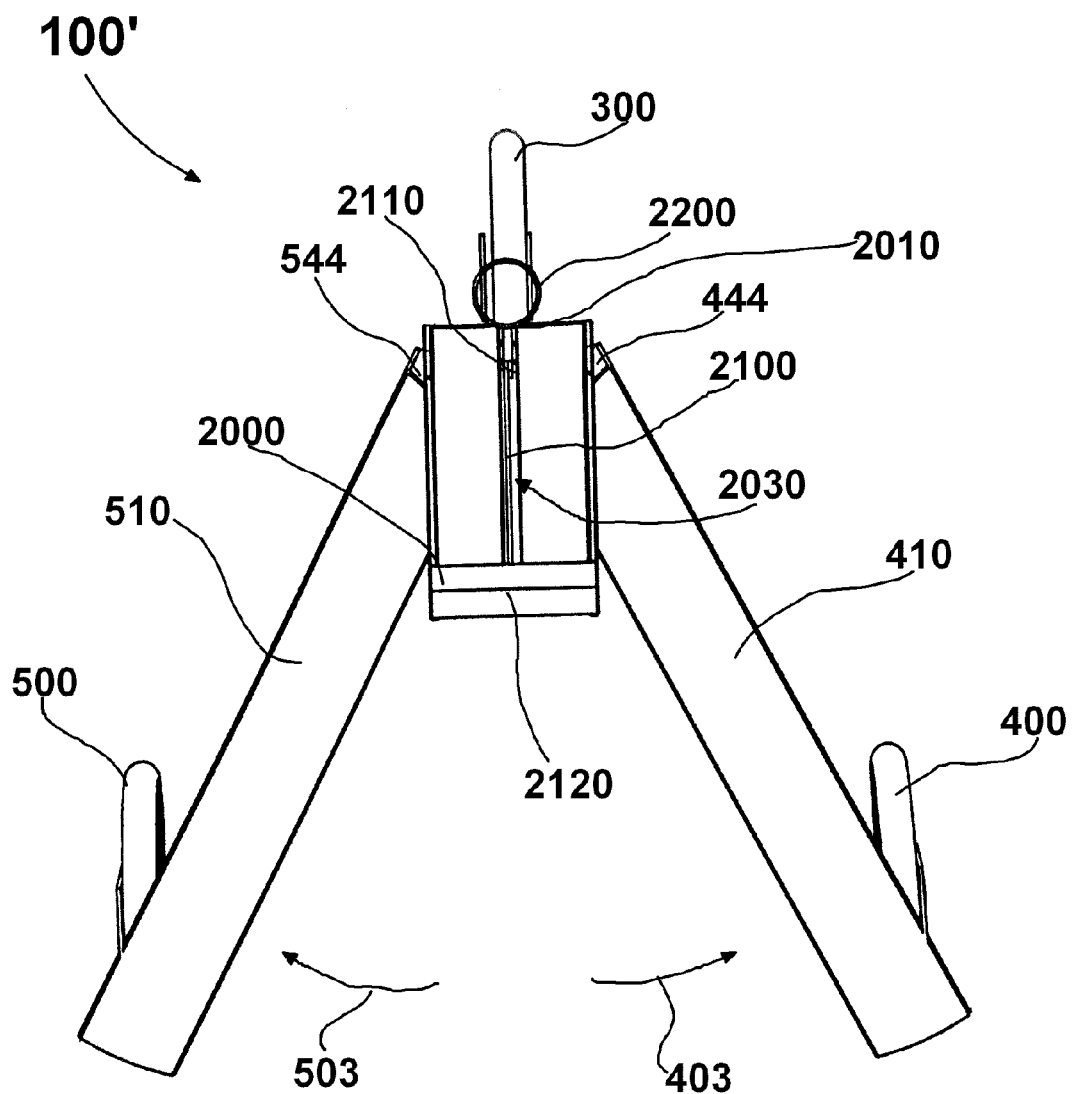
FIG. 21 is a top view of the deployment and retraction system schematically shown in FIG. 17, and shown in an extended state, where the sliding housing has been omitted for clarity.
Figure 22:
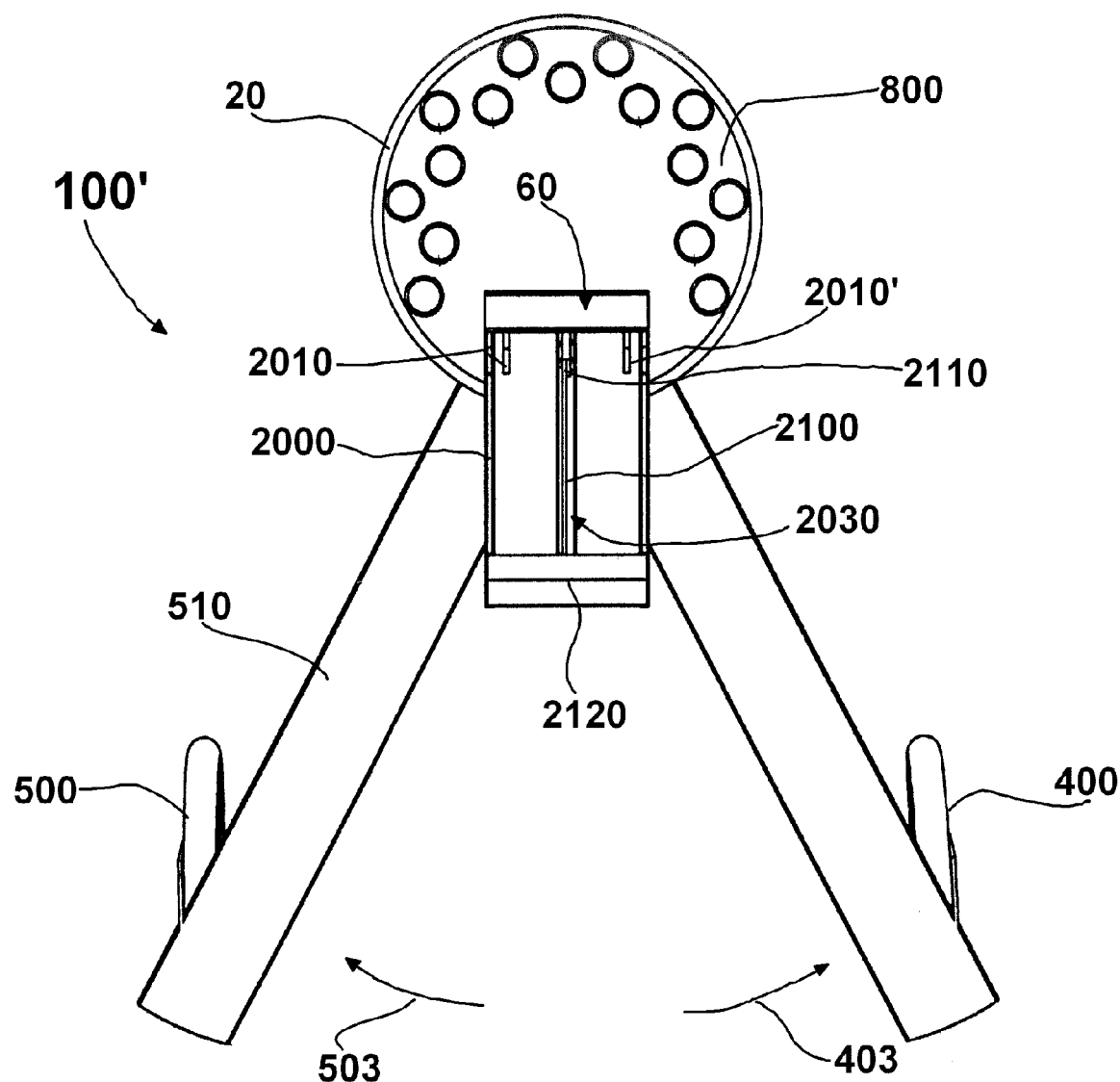
FIG. 22 is a top view of a sports bag with integral wheeled transportation system of FIG. 17 shown in an extended state.

FIG. 16 is a schematic view of another embodiment of the deployment and retraction system 100' which includes a sliding member 2200 in a sliding housing 2300. FIG. 17 is a side view of the deployment and retraction system 100' shown in an extended state, where the sliding housing 2300 has been omitted for clarity. FIG. 18 is a side view of a sports bag with integral wheeled transportation system 100' shown in an extended state. FIG. 19 is a rear view of the deployment and retraction system 100' shown in an extended state where the sliding housing 2300 has been omitted for clarity. FIG. 20 is a rear view of a sports bag with integral wheeled transportation system 100' shown in an extended state. FIG. 21 is a top view of the deployment and retraction system 100' shown in an extended state, where the sliding housing 2300 has been omitted for clarity. FIG. 22 is a top view of a sports bag with integral wheeled transportation system 100' shown in an extended state.

Figure 23:
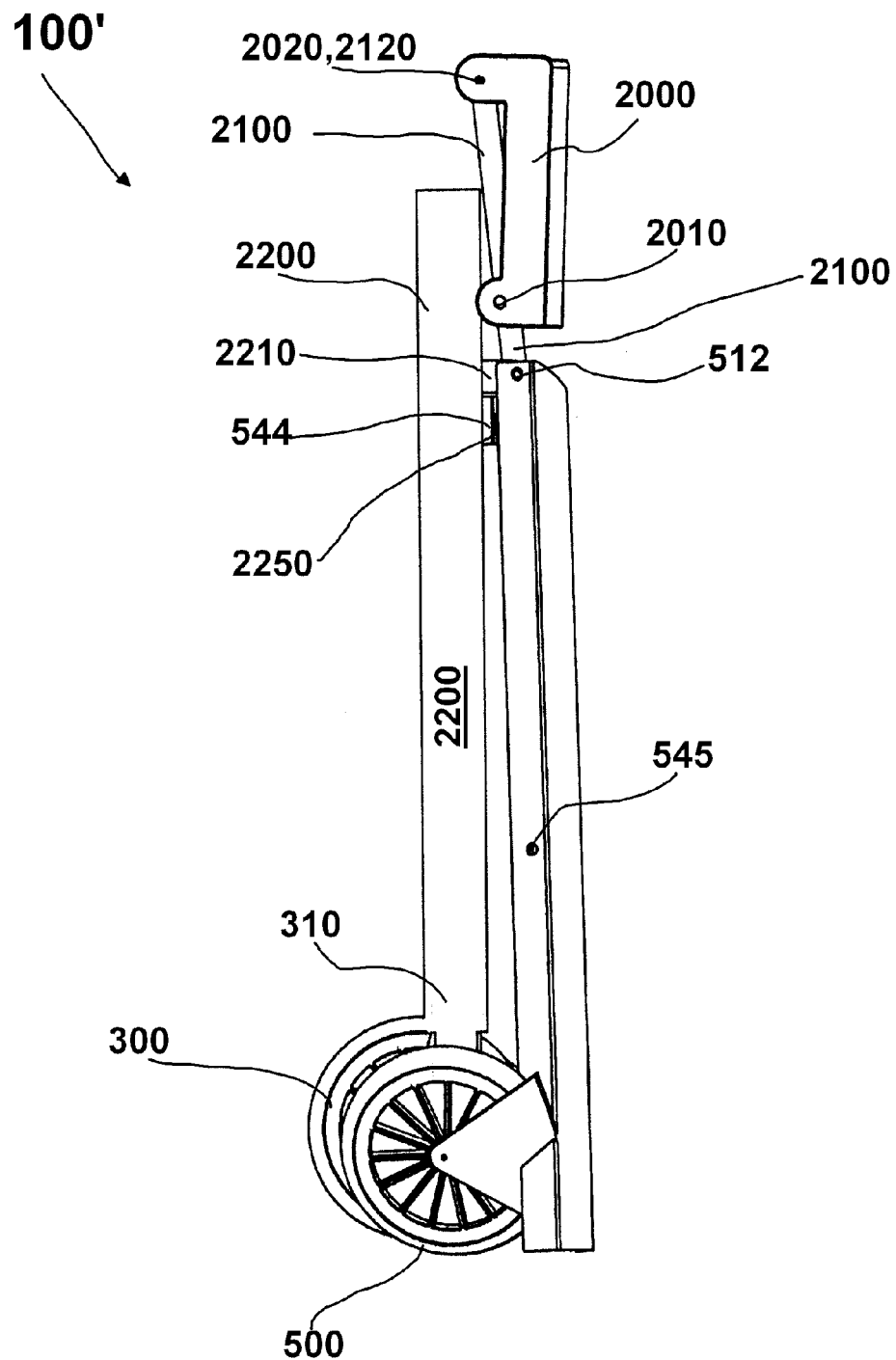
FIG. 23 is a side view of the deployment and retraction system schematically shown in FIG. 16, and shown in a retracted state, where the sliding housing has been omitted for clarity.
Figure 24:
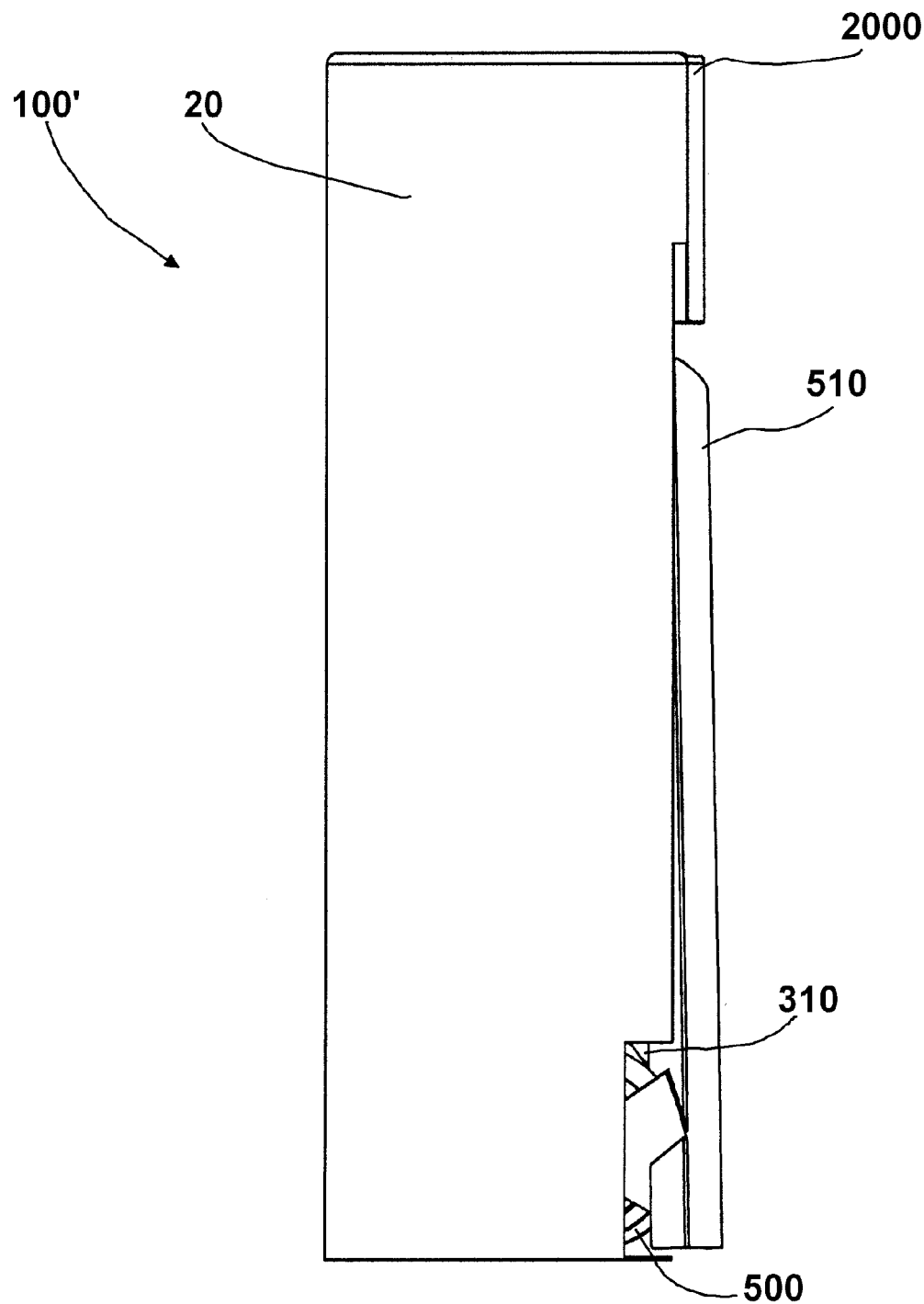
FIG. 24 is a side view of a sports bag with integral wheeled transportation system of FIG. 17 shown in a retracted state.
Figure 25:
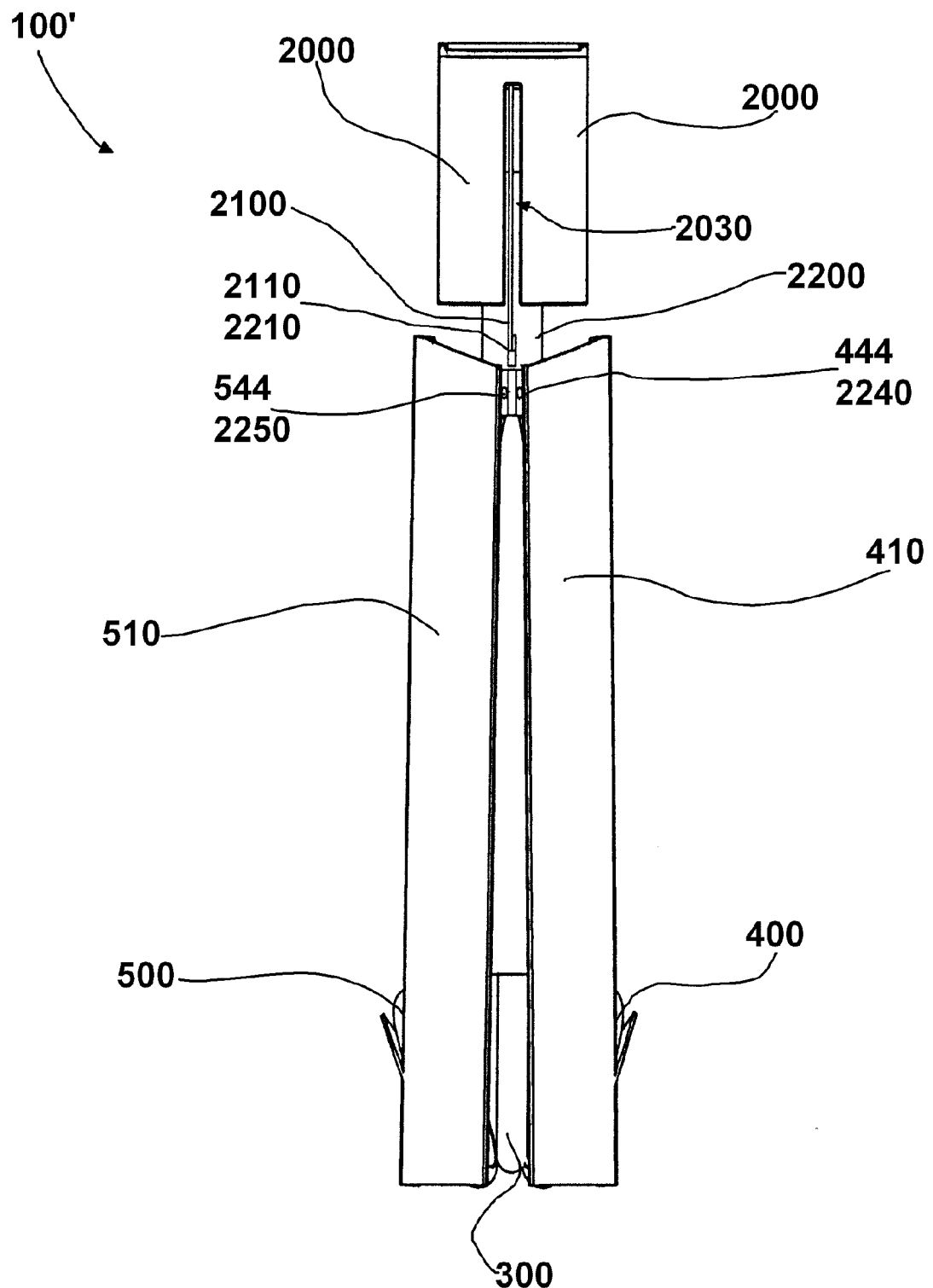
FIG. 25 is a rear view of the deployment and retraction system schematically shown in FIG. 17, and shown in a retracted state, where the sliding housing has been omitted for clarity.
Figure 26:
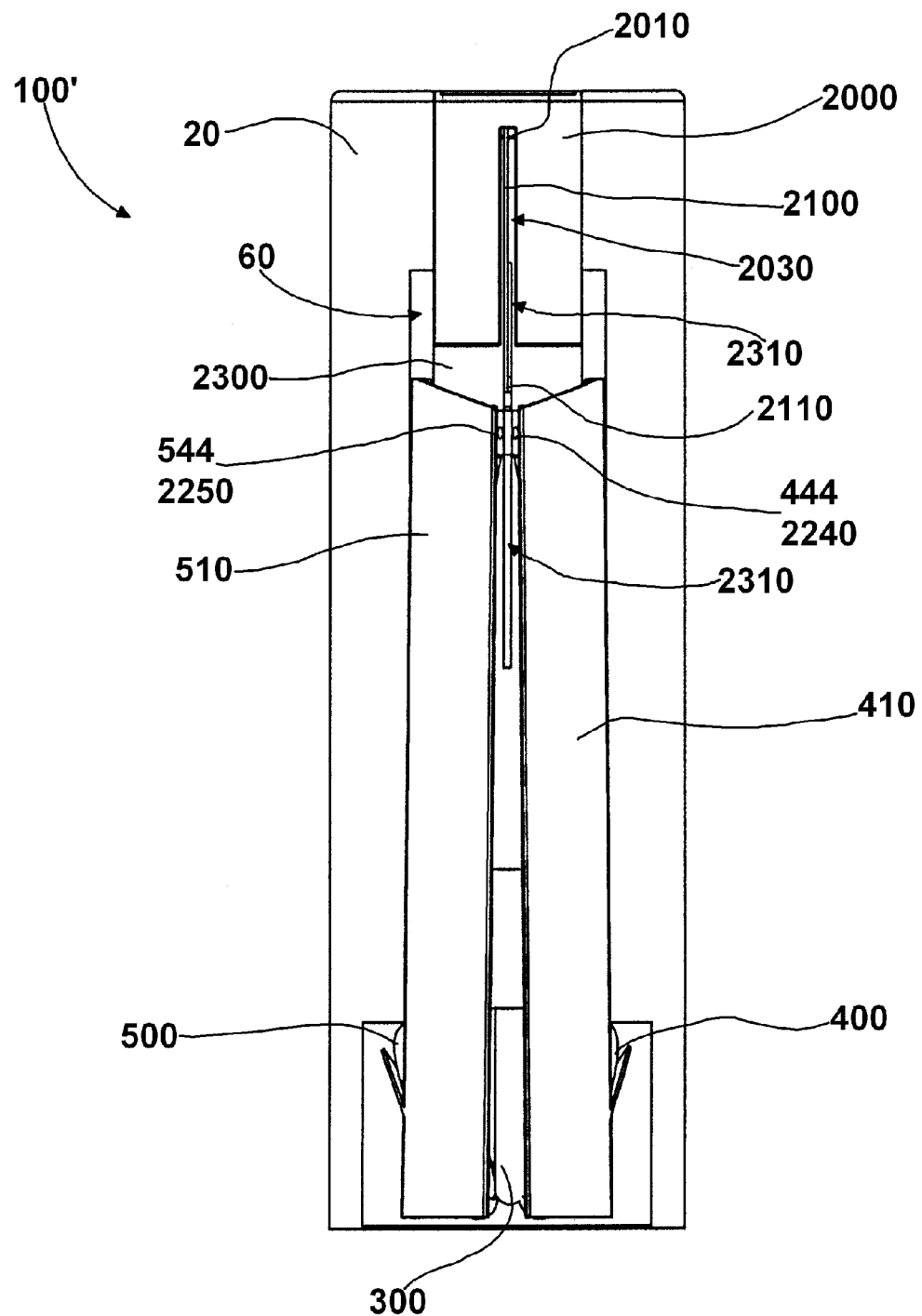
FIG. 26 is a rear view of a sports bag with integral wheeled transportation system of FIG. 17 shown in a retracted state.
Figure 27:
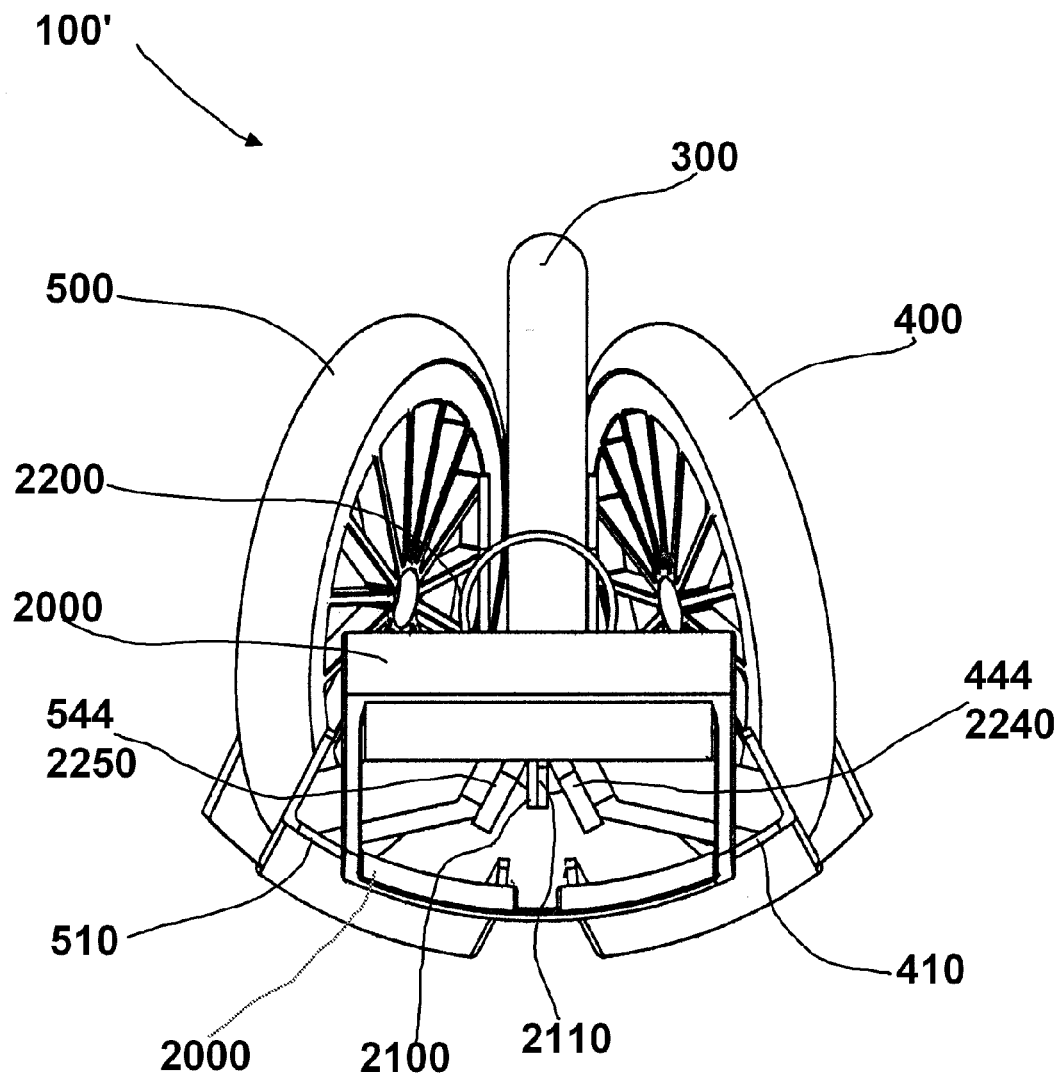
FIG. 27 is a top view of the deployment and retraction system schematically shown in FIG. 17, and shown in an extended state, where the sliding housing has been omitted for clarity.
Figure 28:
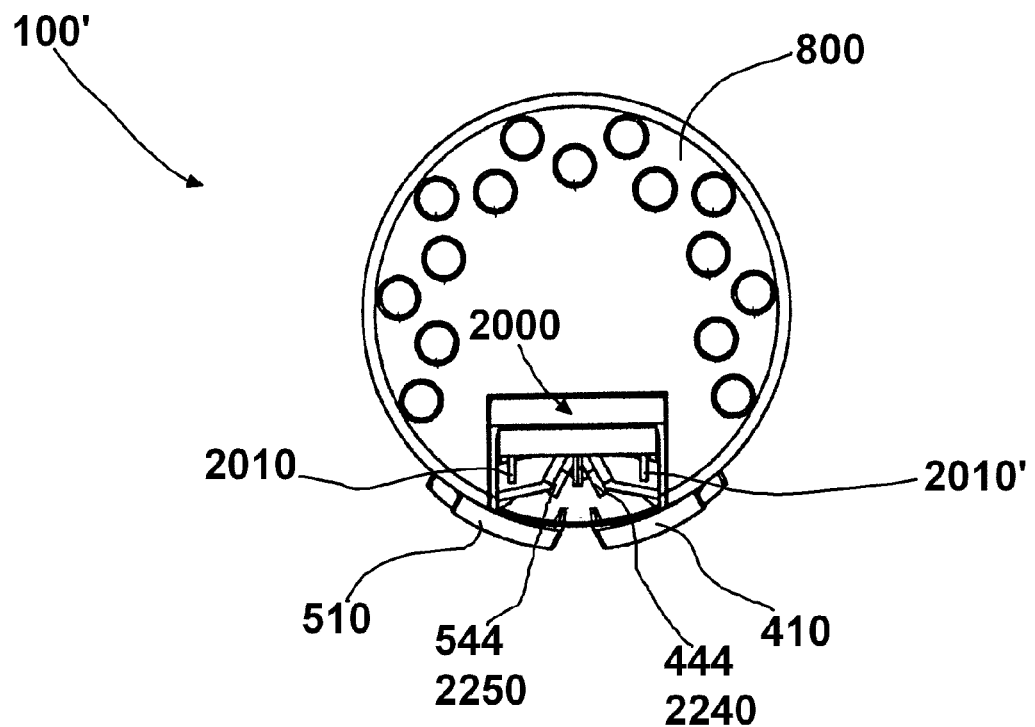
FIG. 28 is a top view of a sports bag with integral wheeled transportation system of FIG. 17 shown in a retracted state.

FIG. 23 is a side view of the deployment and retraction system 100' shown in a retracted state, where the sliding housing 2300 has been omitted for clarity. FIG. 24 is a side view of a sports bag with integral wheeled transportation system 100' shown in a retracted state. FIG. 25 is a rear view of the deployment and retraction system 100' shown in a retracted state, where the sliding housing 2300 has been omitted for clarity. FIG. 26 is a rear view of a sports bag with integral wheeled transportation system 100' shown in a retracted state. FIG. 27 is a top view of the deployment and retraction system 100' shown in an extended state, where the sliding housing 2300 has been omitted for clarity. FIG. 28 is a top view of a sports bag with integral wheeled transportation system 100' shown in a retracted state.

Bag 10 can comprise cover 1000, body 20, and integral transportation system 100'. Integral transportation system 100' can include handle 2000 operatively connected to multiple wheels 300, 400, 500, and their associated equipment for deploying and retracting the wheels.

In one embodiment deployment or retraction of wheels 300, 400, 500 can be controlled by rotating handle 2000. Rotating handle 2000 can be pivotally connected to sliding housing 2300 such that handle 2000 can move in the direction of arrow 2050 (and in the opposite direction of arrow 2050). Sliding member 2200 can be operably connected to each of wheels 300, 400, 500. For wheel 400 sliding member 2200 can be operably connected to leg 410 (through link 440) and for wheel 500 also connected to leg 510 (through link 540).

Once integral transportation system 100' is deployed bag 10 can be caused to move in a desired direction by pushing or pulling on handle 110. FIG. 8 shows an individual pushing bag 10, which can incorporate this alternative embodiment for integral transportation system 100'. Once integral transportation system 100' is retracted, bag 10 can be stored or carried without wheels 300, 400, 500 interfering.

FIGS. 16-28 illustrate the mechanics of deployment and retraction of integral transportation system 100. In this embodiment deployment and retraction can be accomplished using a single mechanical movement of steering handle 2000 which is operably connected to wheels 300, 400, 500 (as seen in FIGS. 16-28 via movement in the direction and opposite direction of arrow 2050).

As schematically shown in FIGS. 16-28 deployment or extension of wheels 300, 400,500 by another embodiment of integral wheeled transportation assembly 100' can be achieved by pulling handle 2000 in the direction of arrow 2050 (relative to sliding housing 2300) causing wheel 300 to move linearly in the direction of arrow 302, and at the same time causing wheel 400 to move arcuately in the direction of arrow 402, and wheel 500 to move arcuately in the direction of arrow 502. FIGS. 17 and 19 are side and rear views of bag 10 (with cover removed) showing integral transportation system 100 being deployed.

As schematically shown in FIGS. 16-28 deployment or retraction of wheel 500 can be respectively controlled by moving driving link 2000 either in the direction of arrow 2050 (or in the opposite direction of arrow 2050). Wheel 500 can be connected to leg 510. Leg 510 (at its upper end 512) can be pivotally connected to sliding housing 2300. Because leg 510 is pivotally connected to sliding housing 2300, deployment in the direction of arrow 503 is with an arcuate type movement. Deployment or retraction of wheel 400 can be respectively controlled by moving driving link 2000 either in the direction of arrow 2050 (or in the opposite direction of arrow 2050).

Wheel 400 can be connected to leg 410. Leg 410 (at its upper end 412) can be pivotally connected to sliding housing 2300. Because leg 410 is pivotally connected to sliding housing 2300, deployment in the direction of arrow 403 is with an arcuate type movement.

Deployment and retraction of each of the wheels 300, 400, 500 will be more particularly described below.

Deployment and retraction of wheel 300 will be described in this paragraph. Deployment or retraction of wheel 300 can be respectively controlled by moving handle 2000. Wheel 300 can be pivotally connected to leg 310, and leg 310 can be connected to sliding member 2200. Wheel 300 can be slidingly connected to bag 10 through sliding housing 2300 sliding member 2200, and can be slidingly/pivotally connected to handle 2000 through driving link 2100. Pulling handle 2000 in the direction of arrow 2050 causes driving link 2100 to push sliding member 2200 down (in the direction of arrow 302) causing wheel 300 to deploy downwardly in a linear direction as indicated by arrow 302. Similarly, a movement of handle 2000 in the opposite direction of arrow 2050 causes sliding member 2200 to move upward (in the opposite direction of arrow 302) in sliding housing 2300 and causing wheel 300 to retract inwardly in a linear (in the opposite direction of arrow 302).

Deployment of wheel 500 will be described in this paragraph. As rotating handle 2000 is rotated in a first direction (that of arrow 2050) relative to sliding housing 2300, handle 200 causes driving link 2100 to move (in the directions of arrows 2060 and 2070). Movement of driving link 2100 in the direction of arrow 2070 (relative to sliding housing 2300) causes movement of sliding member 2200 in the direction of arrow 302 (relative to sliding housing 2300). Movement of sliding member 2200 in the direction of arrow 302 causes arm 540 to move in the direction of arrow 2080 (relative to sliding housing 2300) thereby causing movement of leg 510 deploying or extending wheel 500 arcuately (in the direction of arrow 502). Movement of handle 2000 in the opposite direction of arrow 2050 causes the opposite movement of the connected parts. Although not shown in FIG. 16, deployment or extension of wheel 400 similarly follows—with movements of arm 440, leg 410 and wheel 400.

As schematically indicated, pulling handle 2000 in the direction of arrow 2050 (relative to sliding housing 2300) causes driving link 2100 to move (in the directions of arrows 2060 and 2070). Movement of driving link 2100 in the direction of arrow 2070 (relative to sliding housing 2300) causes movement of sliding member 2200 in the direction of arrow 302 (relative to sliding housing 2300). Movement of sliding member 2200 in the direction of arrow 302 (relative to sliding housing 2300) causes arm 540 to move in the direction of arrow 2080 (relative to sliding housing 2300) thereby causing movement of leg 510 deploying or extending wheel 500 arcuately (in the direction of arrow 502). As schematically indicated, pulling handle 2000 in the opposite direction of arrow 2050 (relative to sliding housing 2300) causes driving link 2100 to move (in the directions opposite of arrows 2060 and 2070). Movement of driving link 2100 in the opposite direction of arrow 2070 (relative to sliding housing 2300) causes movement of sliding member 2200 in the opposite direction of arrow 302 (relative to sliding housing 2300). Movement of sliding member 2200 in the opposite direction of arrow 302 (relative to sliding housing 2300) causes arm 540 to move in the opposite direction of arrow 2080 (relative to sliding housing 2300) thereby causing movement of leg 510 retracting wheel 500 arcuately (in the direction of arrow 502). Although not shown in FIG. 16, retraction of wheel 400 similarly follows—with movements of arm 440, leg 410 and wheel 400.

Extension or deployment of wheel 300 can be achieved by pulling on handle 2000 in the direction of arrow 2050, causing wheel 300 to move linearly in the direction of arrow 302, and at the same time causing wheel 400 to move arcuately in the direction of arrow 402, and wheel 500 to move arcuately in the direction of arrow 502. Retraction of wheel 300 can be achieved by pulling on handle 2000 in the opposite direction of arrow 2050, causing wheel 300 to move linearly in the direction opposite of arrow 302, and at the same time causing wheel 400 to move arcuately in the direction opposite of arrow 402, and wheel 500 to move arcuately in the direction opposite of arrow 502.

The following is a list of reference numerals:

| LIST FOR REFERENCE NUMERALS | |
|---|---|
| (Reference No.) | (Description) |
| 10 | golf bag |
| 20 | body |
| 22 | handle |
| 24 | handle |
| 25 | strap |
| 26 | one or more reinforcing ribs or rings |
| 27 | front |
| 28 | rear |
| 30 | upper end |
| 40 | mid section |
| 50 | lower end |
| 60 | recessed area |
| 70 | base |
| 71 | open area |
| 72 | ventilation/drainage system |
| 80 | containment box |
| 82 | sidewall |
| 84 | sidewall |
| 86 | rear wall |
| 88 | base |
| 100 | integral wheeled transportation assembly |
| 110 | handle |
| 111 | arrows |
| 112 | arrow |
| 113 | arrow |
| 114 | arrow |
| 115 | arrow |
| 116 | arrow |
| 117 | arrow |
| 118 | arrow |
| 119 | arrow |
| 120 | first rod |
| 122 | toothed area |
| 124 | toothed area |
| 130 | second rod |
| 132 | toothed area |
| 134 | toothed area |
| 140 | upper bracket |
| 150 | opening |
| 160 | opening |
| 170 | middle bracket |
| 172 | spring or biasing member |
| 180 | opening |
| 185 | opening |
| 190 | opening |
| 200 | lower bracket |
| 210 | opening |
| 212 | opening |
| 215 | opening |
| 220 | gear |
| 222 | arrow |
| 223 | arrows |
| 230 | gear |
| 232 | arrow |
| 233 | arrows |
| 300 | wheel |
| 302 | arrow |
| 303 | arrow |
| 310 | leg |

-continued

LIST FOR REFERENCE NUMERALS

| (Reference No.) | (Description) |
|---|---|
| 320 | fork |
| 330 | toothed area |
| 340 | toothed area |
| 400 | wheel |
| 402 | arrow |
| 403 | arrow |
| 410 | leg |
| 412 | upper end |
| 414 | point |
| 416 | lower end |
| 420 | fork |
| 422 | outside |
| 430 | fastener |
| 440 | arm |
| 441 | end |
| 442 | arrow |
| 500 | wheel |
| 502 | arrow |
| 503 | arrow |
| 510 | leg |
| 512 | upper end |
| 514 | point |
| 516 | lower end |
| 520 | fork |
| 522 | outside |
| 530 | fastener |
| 540 | arm |
| 541 | end |
| 542 | arrow |
| 600 | quick release/lock mechanism |
| 602 | arrow |
| 603 | arrows |
| 604 | arrow |
| 610 | activation mechanism |
| 612 | biasing member |
| 620 | rod |
| 630 | plurality of openings |
| 640 | rod |
| 650 | plurality of openings |
| 700 | brush |
| 710 | brush |
| 720 | brush |
| 800 | upper rack |
| 810 | beam |
| 811 | plurality of dividers or slots |
| 812 | resistance member |
| 814 | resistance member |
| 820 | beam |
| 821 | plurality of dividers or slots |
| 822 | resistance member |
| 824 | biasing means |
| 830 | plurality of dividers or slots |
| 834 | double biasing means |
| 840 | beam |
| 841 | plurality of dividers or slots |
| 842 | resistance member |
| 850 | opening |
| 852 | opening |
| 900 | lower rack |
| 910 | resistance member |
| 912 | plurality of openings in resistance member |
| 920 | row plurality of openings |
| 930 | row plurality of openings |
| 940 | row plurality of openings |
| 950 | row plurality of openings |
| 1000 | cover |
| 1002 | flap for quick release/lock mechanism |
| 1010 | opening |
| 1020 | zipper |
| 1030 | zipper |
| 1050 | stowage compartment |
| 1060 | stowage compartment |
| 1070 | stowage compartment |
| 1080 | pocket |
| 1090 | pocket |

-continued

LIST FOR REFERENCE NUMERALS

| (Reference No.) | (Description) |
|---|---|
| 1500 | travel case |
| 1510 | motorized golf cart |
| 1520 | raised area |
| 1600 | handle |
| 1602 | arrow |
| 1610 | locking pivot |
| 1620 | toothed connector |
| 1630 | toothed connector |
| 1640 | knob |
| 1650 | toothed connector |
| 1660 | toothed connecto |
| 2000 | handle |
| 2010 | first end |
| 2020 | second end |
| 2030 | arrow |
| 2050 | arrow |
| 2060 | arrow |
| 2070 | arrow |
| 2080 | arrow |
| 2100 | driving link |
| 2110 | first end |
| 2120 | second end |
| 2200 | sliding member |
| 2210 | pivoting connection point for driving link 2100 |
| 2240 | pivoting connection point for 400 arm |
| 2250 | pivoting connection point for 500 arm |
| 2300 | sliding housing |
| 2310 | slot |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:
1. A sports equipment bag assembly comprising:
(a) a bag;
(b) an integral transportation system attached to the bag, the integral transportation system including a housing and a member slidingly connected to the housing, plurality of wheels operably connected to the sliding housing via a plurality of wheel legs, the wheels being deployable and retractable between a retracted state and a deployed state;
(c) a handle that is movable between upper position and lower positions, said handle being operably connected to the plurality of deployable wheels and wheel legs;
(d) wherein movement of the handle from the upper to the lower position deploys the plurality of wheels from the retracted state to the deployed state;
(e) wherein movement of the handle from the lower to the upper position retracts the wheels from the deployed state to the retracted state;
(f) during deployment at least one wheel is required to move through a first type of movement and at least one other wheel is required to move through a second type of movement, the first type of movement being different from the second type of movement;
(g) multiple links that join the wheel legs and the handle to the sliding member; and
(h) said links including a first link connecting between the handle and the sliding member and second and third links each connecting between the sliding member and one of the wheel legs.

2. The bag assembly of claim 1, wherein the first type of movement is linear movement and the second type of movement is arcuate.

3. The bag assembly of claim 1, wherein at least two wheels move through the second type of movement.

4. The bag assembly of claim 1, wherein one wheel moves through the first type of movement and simultaneously with the movement of the one wheel through the first type of movement, the other wheels moves through the second type of movement.

5. The bag assembly of claim 1, wherein one wheel is of a different size than at least one other wheel.

6. The bag assembly of claim 1, wherein rotating downwardly on the handle causes the plurality of wheels to simultaneously deploy and rotating upwardly on the handle causes the plurality of wheels to simultaneously retract.

7. The bag assembly of claim 1, further comprising a storage compartment attached to the bag assembly, wherein the storage compartment is removable.

8. A sports equipment bag assembly comprising:
(a) a bag;
(b) an integral transportation system attached to the bag, the integral transportation system including a sliding housing and a member slidingly connected to the sliding housing, at least three wheels operably connected to the sliding housing member via wheel legs and links, the wheels being deployable from a retracted state to a deployed state, the sliding housing including a handle operably connected to the plurality of wheels, the handle being pivotally movable relative to the housing between first and second positions to cause the plurality of wheels to deploy from the retracted state to the deployed state responsive to pivotal movement of the handle along with returning the plurality of wheels from the deployed state to the retracted state responsive to movement of the handle.

9. The bag of claim 8, wherein during deployment at least one wheel moves through a first type of movement and at least one other wheel moves through a second type of movement, the first type of movement being different from the second type of movement.

10. The bag assembly of claim 9, wherein the first type of movement is linear movement and the second type of movement is arcuate.

11. The bag assembly of claim 9, wherein at least two wheels move through the second type of movement.

12. The bag assembly of claim 8, further comprising a handle operatively connected to the integral transportation system, wherein pulling on the handle causes the plurality of wheels to deploy and pushing on the handle causes the plurality of wheels to retract.

13. The bag assembly of claim 8, further comprising a storage compartment attached to the bag assembly, wherein the storage compartment is removable.

14. A sports equipment bag assembly comprising:
(a) a bag having a body having an upper end, lower end, and middle sections, and a longitudinal center;
(b) an integral transportation system attached to the bag, the integral transportation system including a housing and a sliding member slidingly connected to the housing, a plurality of wheels operably connected to the sliding member, each wheel mounted to a wheel leg, each wheel leg attached to the housing, the wheels being deployable from a retracted state to a deployed state, the housing including a handle pivotally connected thereto and operably connected to the plurality of wheels, the handle being both movable between first and second positions and along a curved path and operable to cause the plurality of wheels to deploy from the retracted state to the deployed state responsive to movement of the handle from the first position to the second position along with returning the plurality of wheels from the deployed state to the retracted state responsive to movement of the handle from the second position to the first position;
(c) wherein at least at one point on the body a cross section taken perpendicular to the line forming the longitudinal center forms a shape and the shape transposed down to the lower end will encompass all of the wheels when the integral transportation system is in a retracted state;
(d) wherein during deployment at least one wheel is required to move through a linear type of movement and at least one other wheel is required to move through a pivoting type of movement;
(e) a plurality of links that connect from the sliding member to the legs, one of said links connecting between the handle and the sliding member, others of said links each connecting between the sliding member and a said wheel leg; and
(f) wherein one of the wheel legs moves up and down with the sliding member.

15. The bag of claim 14, wherein the wheels, when in a retracted state, will not be lower than the base.

16. The bag assembly of claim 14, wherein the at least second wheel pivoting type movement is arcuate.

17. The bag assembly of claim 16, wherein at least two wheels move through the arcuate type of movement.

18. The bag assembly of claim 14, wherein there are at least three wheels.

19. The bag assembly of claim 14, further comprising a storage compartment attached to the bag assembly, wherein the storage compartment is removable.

* * * * *